(12) United States Patent
Maikhuri et al.

(10) Patent No.: US 12,229,707 B2
(45) Date of Patent: Feb. 18, 2025

(54) INTUITIVE AI-POWERED WORKER PRODUCTIVITY AND SAFETY

(71) Applicant: Dell Products L.P., Round Rock, TX (US)

(72) Inventors: Ajay Maikhuri, Bangalore (IN); Dhilip Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 18/051,066

(22) Filed: Oct. 31, 2022

(65) Prior Publication Data

US 2024/0144151 A1 May 2, 2024

(51) Int. Cl.
*G06Q 10/06* (2023.01)
*G06Q 10/0639* (2023.01)

(52) U.S. Cl.
CPC .............. *G06Q 10/06398* (2013.01)

(58) Field of Classification Search
None
See application file for complete search history.

(56) References Cited

U.S. PATENT DOCUMENTS

| | | |
|---|---|---|
| 9,734,464 B2 | 8/2017 | Angell et al. |
| 10,204,501 B2 | 2/2019 | Chong et al. |
| 10,643,080 B2 | 5/2020 | Rokade et al. |
| 10,666,594 B2 | 5/2020 | Pfriem et al. |
| 10,713,268 B1 | 7/2020 | Kannan et al. |
| 10,896,331 B2 | 1/2021 | Man |
| 11,064,044 B2 | 7/2021 | Liensberger et al. |
| 11,089,132 B2 | 8/2021 | Liensberger et al. |

(Continued)

FOREIGN PATENT DOCUMENTS

KR 10-1723283 B1 4/2017

OTHER PUBLICATIONS

Marin-Jimenez et al. (Deep Multi-Task Learning for Gait-Based Biometrics; University of Cordoba; University of Malaga; Carnegie Mellon University; Published in: 2017 IEEE International Conference on Image Processing (ICIP); Date Added to IEEE Xplore: Feb. 22, 2018; pp. 106-110).*

(Continued)

*Primary Examiner* — Matthew D Henry
(74) *Attorney, Agent, or Firm* — DALY, CROWLEY, MOFFORD & DURKEE, LLP

(57) ABSTRACT

A method comprises receiving a set of raw worker data records associated with one or more worker activities of a worker, each raw worker data record comprising one or more of an image, a video, information from a sensor, information from interaction with a tool, and information from interaction with a device. A first analysis, configured to analyze the set of raw worker data records for one or more indications regarding whether any worker activities include one or more undesired behaviors, is performed on the set of raw worker data records. Based on the first analysis, a second analysis, configured to categorize and document worker behavior as a function of time, is performed. Based on the second analysis, a third analysis, configured to analyze worker behavior for undesired conditions, is performed. Based on at least one of the second and third analysis, a summary of worker activity is generated.

20 Claims, 10 Drawing Sheets

(56) References Cited

U.S. PATENT DOCUMENTS

| | | | |
|---|---|---|---|
| 11,593,685 | B1 | 2/2023 | Chan et al. |
| 2010/0223212 | A1 | 9/2010 | Manolescu et al. |
| 2015/0302328 | A1* | 10/2015 | Zeng ................ G06Q 10/06398 705/7.38 |
| 2016/0063874 | A1 | 3/2016 | Czerwinski et al. |
| 2016/0260046 | A1* | 9/2016 | Cai ........................ G16H 40/63 |
| 2018/0107962 | A1 | 4/2018 | Lundin et al. |
| 2019/0138967 | A1 | 5/2019 | Akella |
| 2019/0279164 | A1 | 9/2019 | Byron et al. |
| 2020/0090089 | A1* | 3/2020 | Aston ................ G06Q 10/0635 |
| 2020/0364588 | A1 | 11/2020 | Knox |
| 2021/0109497 | A1* | 4/2021 | Man ....................... G06V 10/82 |

OTHER PUBLICATIONS

Becerra et al., "Infrared Thermal Imaging Monitoring on Hands When Performing Repetitive Tasks: An Experimental Study;" PLoS One 16(5); Published Online May 12, 2021; 55 Pages.

Esen, "Occupational Health and Safety with Video Recognition;" Blog from Intenseye (https://www.intensye.com); Feb. 8, 2022; 12 Pages.

U.S. Appl. No. 17/818,764, filed Aug. 10, 2022, Maikhuri et al.

U.S. Appl. No. 18/052,314, filed Nov. 3, 2022, Maikhuri et al.

U.S. Bureau of Labor Statistics, "2.8 Million Nonfatal Workplace Injuries and Illnesses Occurred in Private Industry in 2019;" Publication from TED: The Economics Daily; Nov. 6, 2020; 2 Pages.

Vrigkas et al., "A Review of Human Activity Recognition Methods;" Review Article in Frontiers in Robotics and AI 2(28); Nov. 2015; 81 Pages.

Wang et al., "Discriminative Hierarchical Part-Based Models for Human Parsing and Action Recognition;" Journal of Machine Learning Research, vol. 13; Oct. 2012; pp. 3075-3102; 28 Pages.

Wiggers, "Computer Vision-Powered Workplace Safety Systems Could Lead to Bias and Other Harms;" Article from VentureBeat; Sep. 21, 2021; 16 Pages.

Response to U.S. Non-Final Office Action dated Mar. 7, 2024 for U.S. Appl. No. 17/818,764; Response filed Jun. 7, 2024; 19 Pages.

U.S. Non-Final Office Action dated Mar. 7, 2024 for U.S. Appl. No. 17/818,764; 30 Pages.

U.S. Final Office Action dated Sep. 24, 2024 for U.S. Appl. No. 17/818,764; 45 Pages.

* cited by examiner

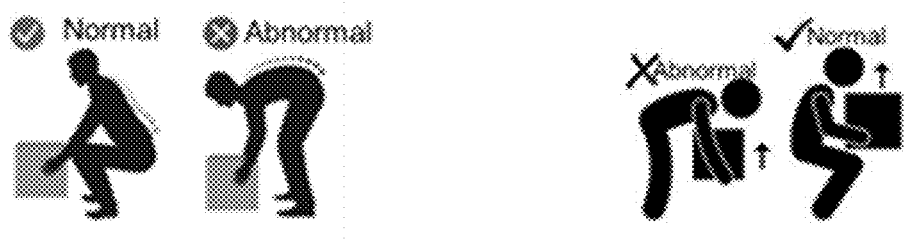
FIG. 2A
FIG. 2B
FIG. 2C
FIG. 2D

| Position | Worker | Day | Shift Hour | Position Duration |
|---|---|---|---|---|
| 🧍 | Worker1 | 13/05/2022 | 8AM | 3 Hours |
| 🧍 | Worker2 | 13/05/2022 | 12PM | 30 Minutes |
| 🧍 | Worker1 | 16/05/2022 | 8AM | 5 Hours |
| 🧍 | Worker2 | 16/05/2022 | 8AM | 5 Minutes |
| 🧍 | Worker1 | 18/05/2022 | 8AM | 2 Hours |
| 🧍 | Worker2 | 18/05/2022 | 8AM | 2 Minutes |
| 🧍 | Worker1 | 19/05/2022 | 8AM | 1 Hour |

| Worker | Analysis - Output | Level |
|---|---|---|
| Worker1 | Leads to Bad Health | ◐ |
| Worker2 | Early symptoms Position needs to be changed | ○ |
| Worker4 | No Symptoms | ● |
| Worker5 | Leads to Bad Health | ◐ |
| Worker6 | No symptoms yet but Position needs to be changed | ○ |
| Worker7 | Leads to Bad Health | ◐ |
| Worker8 | Leads to Bad Health | ◐ |

| Worker | Position/ Activity from images | Day | Shift hour | Position/ Activity Duration | Sensor data | Tool/machine Data | Analysis output; possible undesirable, unhealth, and/or abnormal activities | Coded level |
|---|---|---|---|---|---|---|---|---|
| 1 | Lifting box and carrying box | 13/05/2022 | 8am | 3 hours | Tag data showing positions of boxes | n/a | Employee position can lead to muscle strain; Position should be changed to reduce injury; show recommended position to user; efficiency is OK | Leads to bad health |
| 2 | Operating forklift to move cargo from truck to storage | 13/05/2022 | 9am | 6 hours | Tag data showing positions of cargo | Vehicle speed, fuel used | Based on quantity of cargo moved, vehicle speed, forklift is being operated inefficiently; idling too long, and should be shut down in between long delays in movements to save fuel. | Early symptoms of undesired outcome (inefficiency) |
| 3 | Scanning received project and manually entering information | 15/05/2022 | 1pm | 30 minutes | Tag data from barcodes | Activity data from barcode scanner | Worker is bending vs squatting to scan bar codes; worker is using computer at incorrect monitor height and too close to monitor; recommend adjusting computer to reduce eye strain and bringing product closer to waist level to reduce back strain | No symptoms but changes must be made |
| 1 | Lifting and carrying box | 15/05/2022 | 3pm | 2 hours | Tag data showing positions of boxes | n/a | Worker performed task correctly but slower than normal and less efficiently than for same task done during mornings at other times; recommend mid-afternoon refreshment break to increase energy | Early symptoms showing fatigue |
| 4 | Performing manufacturing procedure and automated test of manufactured parts. | 16/05/2022 | 7am | 3 hours | n/a | Automated test run reports; computer activity reports | Worker having frequent interruptions due to computer activity responding to emails while performing tests, lowered accuracy and efficiency, some procedures performed incorrectly resulting in increased wear. Recommend limiting email use while running automated tests. | Undesired outcome taking place |
| 5 | Rewiring light fixtures in ceiling while on ladder | 17/05/2022 | 10am | 15 minutes | n/a | n/a | Worker is incorrectly positioning ladder during rewiring which can lead to risk of fall; worker actually slipped because ladder shifted during use; provide training in proper ladder usage | Leads to bad health |
| 6 | Cleaning office | 17/05/2022 | 8pm | 4 hours | n/a | n/a | Worker is carrying heavy cleaning equipment around, lifting heavy trash bins incorrectly, not wearing gloves while using chemicals; recommend training on proper lifting and cleaning to ensure safety | Leads to bad health |

FIG. 8

INTUITIVE AI-POWERED WORKER PRODUCTIVITY AND SAFETY

FIELD

Embodiments of the disclosure generally relate to interactions between humans and machines, such as computerized devices, systems, and methods for monitoring and responding to various interactions and actions of a user, via an automated, intelligent personal agent.

BACKGROUND

Various types of so-called "digital personal assistants" are known, including but not limited to ALEXA (provided by Amazon Corporation of Seattle, Washington), CORTANA (provided by Microsoft Corporation of Redmond, Washington), GOOGLE (provided by Alphabet Inc., of Mountain View, California), BIXBY (provided by Samsung Corporation of Suwon-Si, South Korea) and SIRI (provided by Apple Computer of Cupertino, California). A digital personal assistant is a software-based service or agent, often residing in the cloud, which is designed to perform tasks for an individual and/or help end-users complete tasks online. The digital personal assistant can be accessed via a specific device that is configured for that assistant (e.g., a smart speaker device such as the GOOGLE NEST or the ECHO DOT) or via an application running on another device (e.g., a user's computer, mobile phone, television, automobile, etc.).

In a number of instances, the digital personal assistant is primarily responsive to a user's voice commands, typically via a predetermined "wake word" (such as a name assigned to the digital personal assistant). Examples of such tasks include answering questions, managing schedules, making purchases, answering the phone, performing so-called "smart" home control, playing music, accessing other services on computer platforms, and the like. Various services and tasks, especially in response to user requests, can be configured to be performed, based on preconfigured routines, user input, location awareness, receiving notifications from other services, and accessing information from various online sources (such as weather or traffic conditions, news, stock prices, user schedules, retail prices, etc.).

With some digital personal assistants, the digital personal assistant can customize the way it responds to user requests, or it can suggest additional actions and activities, based on tracking past interactions with the user or tracking other actions to which it has access. For example, a digital personal assistant might initiate a reminder to order a product based on a user's past history of ordering a product or might alert a user regarding the status of an order.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

Although digital personal assistants are becoming increasingly common in the consumer environment, they are not as commonly used in the business environment. For example, digital personal assistants can sometimes be limited to reacting to user requests versus proactively taking actions based on knowledge of user actions, interactions, tasks, etcetera. There have been some other types of providing intelligent user interactions that have been developed, including user monitoring, which have been available, such as digital workplace platforms and employee experience platforms. For example, the MICROSOFT VIVA product (available from Microsoft Corporation of Redmond, Washington), is a so-called "employee experience platform" that leverages user interaction with other existing Microsoft products (e.g., TEAMS and MICROSOFT 365) to unify access to various services, such as a personalized gateway to an employee's digital workplace (enabling the employee to access internal communications and company resources like policies and benefits), both individual and aggregated insights on how employee time is spent (e.g., in meetings, on emails, etc.), an aggregation of all the learning resources available to an organization, and an aggregation of topics and organization-specific information, obtained by using artificial intelligence (AI) to automatically search for and identify topics in a given organization, compile information about them (short description, people working on the topic, and sites, files, and pages that are related to it), and provide access to users.

Although products such as VIVA are useful in corporations to help increase productivity and help employees access important information, there are limits to how personal and relevant its functionality may be to any given employee and limits to how much it can improve the performance and effectiveness of individual employees. Further, there are many other important types of interactions and employee activities that are constantly taking place but which may not be monitored, tracked, and analyzed, in a way to benefit an employee individually, including by personal assistant devices and systems.

For example, personal assistants and other similar systems do not monitor or respond to physical aspects of the way employees perform tasks, such as physical movements, posture and/or position during task performance, the balance of time between task actions and breaks, individual variability in manner and/or skill relating to the use and/or operation of tools, machines, and/or other devices associated with a task, etcetera. In addition, the challenges of dealing with a workforce where many employees work remotely, or where there are too many employees, working in too many locations, to adequately observe physical aspects on a regular basis, can impact the ability of such a product to truly improve the personal effectiveness of its employees. Lack of this kind of knowledge also can impact the effectiveness of training to help remedy deficiencies, especially training that may be personalized to an individual's needs.

It is a common goal of employees and employers for employees, including in workplaces connected to computer networks, to reach their full potential in their career and to do so without injury, downtime, loss of productivity, and inefficiency. Employees strive each day to do their jobs to the best of their ability, in an efficient and productive manner. In order to do this, an employee must utilize all of the skills that they have. To perform at their highest ability, an employee must strive to maximize their personal effectiveness and ensure that they are performing tasks appropriately, and workers must strive to use their skills effectively and efficiently.

Personal Effectiveness can mean varying things based on an individual's career, personal life, and goals. As a general concept, personal effectiveness at least refers to using means to utilize all of the employee skills, talent, and energy to reach a goal or set of goals in that person's life. Many hope to improve their own personal effectiveness but are unsure how to manage this or accomplish this in their connected workspace. Many also may not be aware of ways that their particular job performance, is causing them physical harm, reducing productivity, and/or creating issues with poor product quality and increasing need for maintenance. In the modern workplaces, which may include not just in-person manufacturing type environments, but also flexible, remote, and/or hybrid environments (e.g., a mix of working in a workplace, and working remotely or from home), employees are still concerned about personal effectiveness. It is important to devote time for developing personal effectiveness, but it can be difficult to implement and use existing automated tools, such as personal digital assistants and/or employee experience platforms, to personalize their operation to help a user better meet goals, especially professional goals. It also can be difficult to link automated tools to ways of monitoring issues arising from some types of worker actions, such as physical actions.

In recent times, the demand for various products has increased across geographies. To manufacture and deliver these products, we need a skilled workforce. Unfortunately, there is a huge scarcity of skilled workers in today's world. As per Gartner surveys, 57% of manufacturing leaders say that their organization lacks skilled workers. Many businesses are on the lookout for a qualified workers to help them meet their growing workforce needs. However, over time, some of the abilities have become obsolete, and the available workforce is unable to match the demand for new talents. Millions of unemployed, low-skilled individuals, on the other hand, lack the necessary abilities to perform specific tasks.

Utilizing under-skill/unskilled labor to perform the job can lead to negative outcomes for businesses, such as bad product quality, reduced productivity and output, increased costs and downtown associated with the maintenance of tools and/or equipment used on the job due to mishandling, and excessive costs of training and/or retraining employees. Utilizing under-skilled and/or unskilled labor to perform tasks can also lead to negative outcomes for employees, such as increased potential for on-the-job accidents, increased chances of injuries, and reduced sense of personal effectiveness resulting from poor quality of work. For example, inadequately performing a task, acquiring habits that require more effort, and sitting or standing for long periods of time in one position have all been connected to health problems that lead to inefficiency at work.

According to the United States Bureau of Labor statistics, there were approximately 2.8 million non-fatal injuries and illnesses in the workplace reported by private industry employers in each of the years 2017, 2018, and 2019. This leads to an average incidence rate in each of these years, for total recordable cases in 2019, of 2.8 cases per 100 full-time equivalent workers, according to the United States Bureau of Labor Statistics. It is estimated that work-related injuries and illnesses cause the loss of about 3.9% of all years of work in the world and 3.3% of the European Union (EU), which is equivalent to a cost of approximately 2,680 billion and 476 billion dollars, respectively. Injuries can be caused in many ways, including unsafe working environments, improperly performed tasks, and some types of repetitive work, any of which can be exacerbated by additional types of workplace environmental exposures, including both factors in the environment (e.g., vibration, excessive forces, environmental temperature and conditions, harmful chemicals and vapors, etc.) and factors over which a worker has greater control (e.g., inappropriate postures, improper performance of a task, repetitive movements, etc.).

In response to these issues, some organizations have increased their training costs to update the skills of both existing and newly hired workers. However, because they provide routine instruction to everyone, such a standard training strategy is insufficient and ineffective in obtaining the optimum yield from workers. Moreover, certain employees may have more unique and personal types of factors that may lead to increased inefficiencies or increased injuries. For example, a training that teaches a particular method of skill may not account for certain physical variations in employees (e.g., strength, height, etc.), such that training relating skills, techniques, methods, and/or equipment for performing tasks, may need to be adapted, adjusted, and/or personalized, based on the individual factors associated with a given worker or employee.

There is a need to be aware of and have access to the many environments and interactions that can be monitored, analyzed, tracked, and/or improved, while still also allowing the user or employee to use these environments and interactions as part of performing job tasks. In addition to basic skill development training, there is a compelling need to identify a worker's individual weaknesses in order to provide personalized training, which can help improve performance and/or help reduce injuries. This type of tailored training can be generated by analyzing the worker's efficient and inefficient behaviors, including but not limited to movements, gestures, postures, behaviors, and even physical/biometric characteristics (e.g., body temperature).

Before the advent of so many virtual meetings and supervisor-heavy manufacturing and test environments, in person "face" time between employees and supervisors provided sufficient exposure and interaction for supervisors to identify the skills that need improvement. However, doing this is more challenging in the connected workspace with so many remote employees and also in geographically diverse manufacturing and test environments, where a supervisor responsible for an end product may not always have visibility into the worker actions at all steps of the production of a product. For example, engineers tasked with diagnosing failures of manufacturing equipment and/or problems with manufacturing processes, leading to poor quality or malfunctioning products, may not have the information necessary to determine when the source of an issue relates to the skills and/or physical way an employee is performing a task. Employees may unconsciously be creating product and/or production issues and/or defects simply by performing a task with less skill due to fatigue or improper handling of equipment.

As noted above, there are a plethora of digital personal assistant and employee experience platforms that are attempting to improve employee performance and the employee experience, but these products do not meet all the needs of the current workplace. There is a need for a solution that goes beyond the currently available products, to leverage, improve, and expand on the types of functions they perform, while adding new functionality to provide even further insights and help for employees.

In addition to basic skill development training, there is a compelling need to identify a worker's individual weaknesses in order to provide personalized training. In certain embodiments herein, systems, methods, and devices are provided to enable generation of systems that provide tailored training, by analyzing the worker's behaviors and evaluating efficiency and identifying and suggesting remedies for potential issues with employee behaviors.

In certain embodiments, solutions are provided for recording and analyzing on-the-job activities of a physical worker, such as habits, work style, time spent on a task, emotions, and sentiments, in order to identify challenges, such as having a work style that leads to health issues, such as long hours sitting or standing, working in a specific position for an extended period of time, lifting heavy material, incorrectly handling material and equipment prone to accidents and injuries, and employee actions that may lead to equipment maintenance issues. This analysis allows for personalized worker training and timely health consultations.

In addition, there is a need for a product that combines the personalization and continuous learning of the consumer type of digital personal assistants, along with the advantages, corporate access, and features of employee experience platforms, which also goes beyond to provide additional important features, such as tracking multiple platforms and types of user physical interactions, including but not limited to physical movements, gestures, behaviors, interactions with tools, etc., analyzing sentiments and other behavioral cues, applying knowledge and information from accumulated physical interaction information (both from that worker/employee and possibly others) and classifying and analyzing the user interactions. Advantageously, such a system operates in the background as both a digital assistant and a digital coach/mentor, to analyze the employee actions and interactions, provide useful and organized summaries, and make recommendations to enable the employee to reach the employee's personal goals, improve efficiency, and reduce chances of injury to the worker/employee as well as reducing damage and/or maintenance cost to equipment.

Still another issue with the present work environment, be it fully remote or even partially remote, is getting appropriate assistance, training, and mentoring, especially for workers who regularly perform physical jobs and other tasks which may not provide a tangible record of progress or how the job was performed (e.g., reports, memos, electronic mail messages, etc.) and/or workers whose supervisor is not always there to make their own observations about employee task performance. Supervisors cannot supervise or view the work habits of every employee all the time, and thus cannot always have the ability to act more quickly to address issues and provide positive and constructive feedback. Supervisors, even in a non-virtual world, do not always have regular opportunities to formally and informally view and assess their employees personal effectiveness, efficiency, and well-being, especially if there are a large number of employees being supervised. Frequent feedback, training and interaction not only can improve an employee's performance, but it also helps to maintain employee confidence. It can be challenging for the employee to act, respond and get assisted in an effective way.

It would be advantageous to make better use of the multiple types of image and/or visual records of employees performing tasks (e.g., video streams, still images, etc.) that can be generated easily and/or derived from existing types of records (e.g., streams of video from surveillance cameras). It may be advantageous to make use of information derived from the image/visual records in combination with one or more other digital records created by employees in the virtual world, including from various types of sensors and optionally in interactions such as virtual meetings, emails, messaging, etc. Certain embodiments herein are able to analyze one or more types of employee records, including at least visual and image records, to improve employee/worker effectiveness and performance, including but not limited to:

- video and/or image records associated with on the job activities and behaviors of a worker/employee, including but not limited to physical movements, gestures, posture, habits, work style, work speed, emotions, sentiments, and/or use of tools, machines, and/or technology at work;
- digital information recorded from various types of sensors, such as those worn or carried by an individual, attached to an object, mounted to or within a structure or vehicle, etc. digital information obtained from machines, tools, vehicles, devices, etc., with which a worker or user interacts;
- tangible and/or written records (e.g., texts, emails, reports) that may be associated communications with colleagues on task performance, project details, initiatives, innovation, etc.;
- audio and/or video records associated with telephone calls, conference calls, in-person meetings, and/or virtual meetings with supervisors, colleagues, vendors, customers, etc., relating to performance of tasks, project details, initiatives, innovations, offers, negotiations, strategies, and/or and presentations; and/or
- records in multiple types of formats (text, audio, video, and/or a mix) relating to learning on topics of interest that could help organization and personnel.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also comprises receiving a set of raw worker data records associated with one or more worker activities of a worker, each respective raw worker data record comprising one or more of an image, a video, information from a sensor, information from interaction with a tool, and information from interaction with a device; performing a first analysis on the set of raw worker data records, the first analysis configured to analyze the set of raw worker data records for one or more indications regarding whether any worker activities include one or more undesired behaviors; performing, based on the first analysis, a second analysis, the second analysis configured to categorize and document worker behavior as a function of time; performing, based on the second analysis, a third analysis, the third analysis configured to analyze worker behavior for undesired conditions; and generating, based on at least one of, second analysis, and third analysis, a summary of worker activity. Other embodiments of this aspect include corresponding computer systems, apparatus, and computer programs recorded on one or more computer storage devices, each configured to perform the actions of the methods.

Implementations may include one or more of the following features. The computer-implemented method further comprising generating, based on the summary of worker activity, an output comprising at least one recommended action for the worker. The computer-implemented method further is implemented where the summary of worker activity comprises an indicator of an undesired condition associated with worker activity and where the at least one recommended action is configured to remediate at least some of the undesired condition. The repository is configured to continually accumulate information about the worker. The at least one recommended action is further based on information stored in the repository. At least one of the first analysis, second analysis, and third analysis are based at least in part on accumulated information about the worker in the repository. The first analysis comprises image processing using a convolution neural network (CNN). Implementations of the described techniques may include hardware, a method or process, or computer software on a computer-accessible medium.

One general aspect includes a system. The system also comprises a processor; and a non-volatile memory in operable communication with the processor and storing computer program code that when executed on the processor causes the processor to execute a process operable to perform the operations of: receiving a set of raw worker data records associated with one or more worker activities of a worker, each respective raw worker data record comprising one or more of an image, a video, information from a sensor, information from interaction with a tool, and information from interaction with a device; performing a first analysis on the set of raw worker data records, the first analysis configured to analyze the set of raw worker data records for one or more indications regarding whether any worker activities include one or more undesired behaviors; performing, based on the first analysis, a second analysis, the second analysis configured to categorize and document worker behavior as a function of time; performing, based on the second analysis, a third analysis, the third analysis configured to analyze worker behavior for undesired conditions; and generating, based on at least one of the first analysis, second analysis, and third analysis, a summary of worker activity. Other embodiments of this aspect include corresponding computer systems, apparatus, and computer programs recorded on one or more computer storage devices, each configured to perform the actions of the methods.

Implementations may include one or more of the following features. The system further may comprise providing computer program code that when executed on the processor causes the processor to perform the operation of generating, based on the summary of worker activity, an output comprising at least one recommended action for the worker. The system is implemented where the summary of worker activity comprises an indicator of an undesired condition associated with worker activity and where the at least one recommended action is configured to remediate at least some of the undesired condition. The repository is configured to continually accumulate information about the worker. The at least one recommended action is further based on information stored in the repository. At least one of the first analysis, second analysis, and third analysis are based at least in part on accumulated information about the worker in the repository. The first analysis comprises image processing using a convolution neural network (CNN). Implementations of the described techniques may include hardware, a method or process, or computer software on a computer-accessible medium.

One general aspect includes a computer program product including a non-transitory computer readable storage medium having computer program code encoded thereon that when executed on a processor of a computer causes the computer to operate an intelligent assistant system. The computer program product also comprises computer program code for receiving a set of raw worker data records associated with one or more worker activities of a worker, each respective raw worker data record comprising one or more of an image, a video, information from a sensor, information from interaction with a tool, and information from interaction with a device; computer program code for performing a first analysis on the set of raw worker data records, the first analysis configured to analyze the set of raw worker data records for one or more indications regarding whether any worker activities include one or more undesired behaviors; computer program code for performing, based on the first analysis, a second analysis, the second analysis configured to categorize and document worker behavior as a function of time; computer program code for performing, based on the second analysis, a third analysis, the third analysis configured to analyze worker behavior for undesired conditions; and computer program code for generating, based on at least one of, second analysis, and third analysis, a summary of worker activity. Other embodiments of this aspect include corresponding computer systems, apparatus, and computer programs recorded on one or more computer storage devices, each configured to perform the actions of the methods.

Implementations may include one or more of the following features. The computer program product further comprises computer program code for generating, based on the summary of worker activity, an output comprising at least one recommended action for the worker. The computer program product is implemented where the summary of worker activity comprises an indicator of an undesired condition associated with worker activity and where the at least one recommended action is configured to remediate at least some of the undesired condition. The repository is configured to continually accumulate information about the worker. The at least one recommended action is further based on information stored in the repository. The first analysis comprises image processing using a convolution neural network (CNN). Implementations of the described techniques may include hardware, a method or process, or computer software on a computer-accessible medium.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which:

FIG. 2A is a first exemplary illustration comparing normal and abnormal worker movements, in accordance with one embodiment;

FIG. 2B is a second exemplary illustration comparing normal and abnormal worker movements, in accordance with one embodiment;

FIG. 2C is an exemplary illustration showing healthy human behavior with more time taken, in accordance with one embodiment;

FIG. 2D is an exemplary illustration showing healthy human behavior with less time taken, in accordance with one embodiment;

FIG. 7A is a first example table of object position time information for two example workers, in accordance with one embodiment;

FIG. 7B is an example illustration of an analysis output, generated by the system of FIGS. 1 and 3, using the method of FIG. 4, in accordance with one embodiment;

FIG. 8 is an example table of a combined analysis output and set of recommendations, generated by the system of FIGS. 1 and 3, using the method of FIG. 4, in accordance with one embodiment;

The drawings are not to scale, emphasis instead being on illustrating the principles and features of the disclosed embodiments. In addition, in the drawings, like reference numbers indicate like elements.

DETAILED DESCRIPTION

Figure 1:
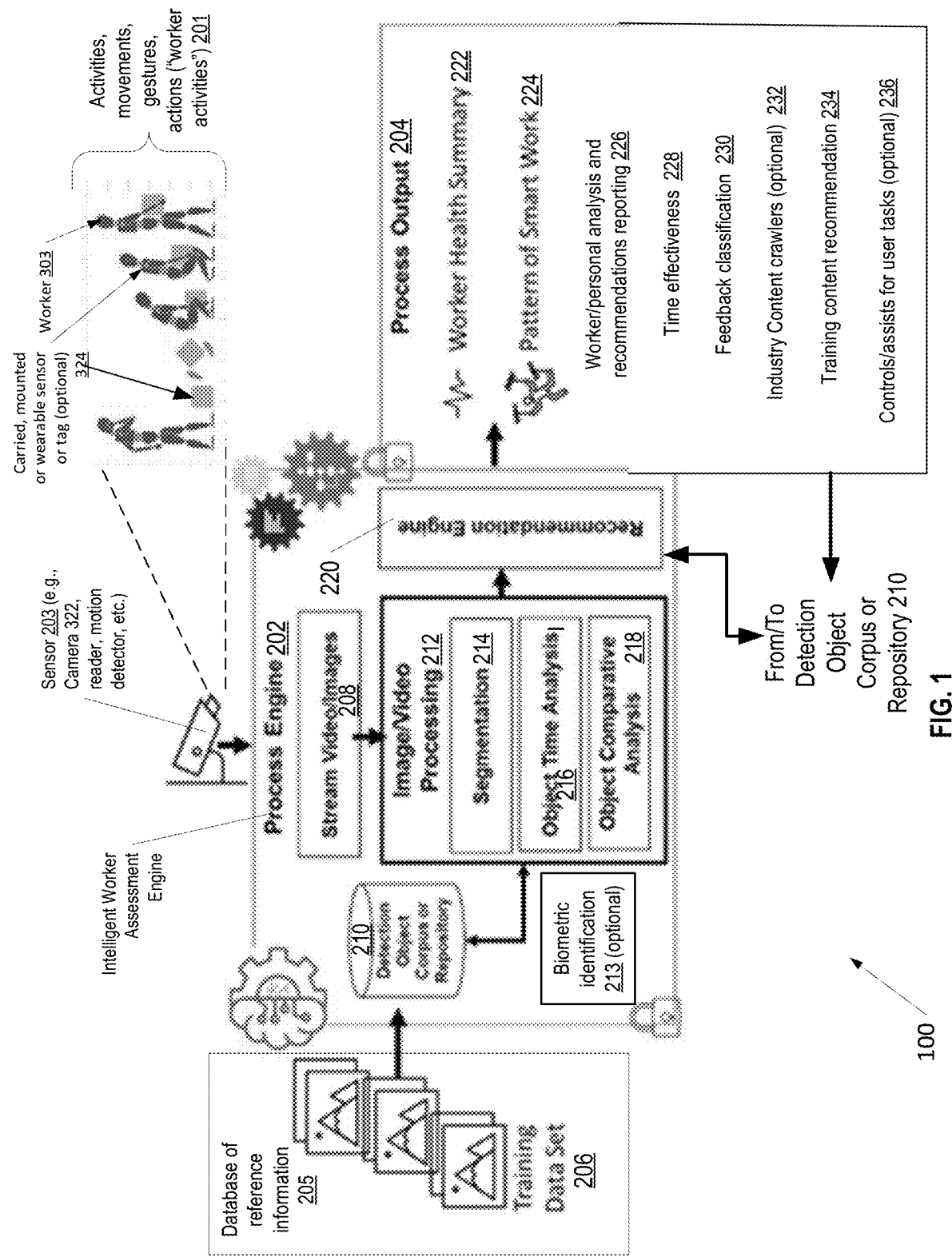
FIG. 1 is an exemplary reference architecture of a system providing artificial intelligence (AI) powered worker productivity and safety, via an Intelligent Worker Assessment Engine (IWAE), in accordance with one embodiment.

Before describing details of the particular systems, devices, arrangements, frameworks, and/or methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

Illustrative embodiments will be described herein with reference to exemplary computer and information processing systems and associated host devices, image capture and image storage devices (e.g., cameras), storage devices and other processing devices. It is to be appreciated, however, that embodiments are not restricted to use with the particular illustrative system and device configurations shown. For convenience, certain concepts and terms used in the specification are collected here. The following terminology definitions (which are intended to be broadly construed), which are in alphabetical order, may be helpful in understanding one or more of the embodiments described herein and should be considered in view of the descriptions herein, the context in which they appear, and knowledge of those of skill in the art.

"Camera" is intended to refer to any and all devices and/or optical instruments, including but not limited to digital cameras, motion picture cameras, web cameras, closed circuit television systems (CCTV), scanners, and any device capable of capturing two-or-three dimensional images of objects (including moving objects, such as human movement), and any device or system capable of capturing one or more of any type of image, including but not limited to any type of still and/or moving image, such as photographs, movies, videos, still or moving images associated with any wavelength of light, whether visible to the human eye or not (e.g., infrared images, images from thermographic or "heat" detecting cameras, radiographic/x-ray imagers, etc.). At least some cameras can produce images and continuous video streams that can be processed to extract data about the object that the camera views. Cameras optionally can include equipment (such as lenses, mirrors, zoom lenses, wide angle lenses, etc.) as part of capturing a given view of an object and optionally can be controlled to change one or more factors, such as exposure, focus, light level, direction, orientation, angle, shutter speed, color, etc. Cameras may be fixed or movable.

"Cloud computing" is intended to refer to all variants of cloud computing, including but not limited to public, private, and hybrid cloud computing. In certain embodiments, cloud computing is characterized by five features or qualities: (1) on-demand self-service; (2) broad network access; (3) resource pooling; (4) rapid elasticity or expansion; and (5) measured service. In certain embodiments, a cloud computing architecture includes front-end and back-end components. Cloud computing platforms, called clients or cloud clients, can include servers, thick or thin clients, zero (ultra-thin) clients, tablets and mobile devices. For example, the front end in a cloud architecture is the visible interface that computer users or clients encounter through their web-enabled client devices. A back-end platform for cloud computing architecture can include single tenant physical servers (also called "bare metal" servers), data storage facilities, virtual machines, a security mechanism, and services, all built in conformance with a deployment model, and all together responsible for providing a service. In certain embodiments, a cloud native ecosystem is a cloud system that is highly distributed, elastic and composable with the container as the modular compute abstraction. One type of cloud computing is software as a service (SaaS), which provides a software distribution model in which a third-party provider hosts applications and makes them available to customers over a network such as the Internet. Other types of cloud computing can include infrastructure as a service (IaaS) and platform as a service (PaaS).

"Computer network" refers at least to methods and types of communication that take place between and among components of a system that is at least partially under computer/processor control, including but not limited to wired communication, wireless communication (including radio communication, Wi-Fi networks, BLUETOOTH communication, etc.), cloud computing networks, telephone systems (both landlines and wireless), networks communicating using various network protocols known in the art, military networks (e.g., Department of Defense Network (DDN)), centralized computer networks, decentralized wireless networks (e.g., Helium, Oxen), networks contained within systems (e.g., devices that communicate within and/ or to/from a vehicle, aircraft, ship, weapon, rocket, etc.), distributed devices that communicate over a network (e.g., Internet of Things), and any network configured to allow a device/node to access information stored elsewhere, to receive instructions, data or other signals from another device, and to send data or signals or other communications from one device to one or more other devices.

"Computer system" refers at least to processing systems that could include desktop computing systems, networked computing systems, data centers, cloud computing and storage systems, as well as other types of processing systems comprising various combinations of physical and virtual processing resources. A computer system also can include one or more desktop or laptop computers, and one or more of any type of device with spare processing capability. A computer system also may include at least one data center or other type of cloud-based system that includes one or more clouds hosting tenants that access cloud resources.

"Computing resource" at least refers to any device, endpoint, component, element, platform, cloud, data center, storage array, client, server, gateway, or other resource, which is part of an IT infrastructure associated with an enterprise.

"Enterprise" at least refers to one or more businesses, one or more corporations or any other one or more entities, groups, or organizations.

"Entity" at least refers to one or more persons, systems, devices, enterprises, and/or any combination of persons, systems, devices, and/or enterprises.

"Human Behavior Recognition" (HBR) [also known in the art as "Human Activity Recognition" (HAR)] at least refers to the method of extracting and predicting the movements of the human body, using a machine or device such as a camera or sensor-based device. Some known HBR/HAR systems examine human activities from video sequences or still images and attempt to correctly identify and classify the input data from the video sequences and/or still images, into an underlying category of activity. For example, in some systems, human activities can be categorized into certain categories. In some HBR/HAR systems, human activities, movements, behaviors, etc., can be further classified into sub-categories, such the following exemplary categories:

- gestures (such as primitive movements of the body parts of a person that may correspond to a particular action of this person; gestures can originate from any bodily motion or state, but commonly originate from the face or hand, and in some instances, systems can attempt to determine or recognize emotion based on gesture recognition, as a way for computers to interpret human body language such as detecting a smile and interpreting a set of likely emotions based on that detection);
- atomic actions (such as motions of a person that describe a particular movement that may be part of a larger activity; for example, a system may recognize the individual atomic actions of "walking,", "bending," "lifting," and "reaching" as part of a larger activity of a worker picking up a box and carrying it from one location to put it on a shelf at another location);
- human-to-object or human-to-human interactions (such as interactions between two or more people or things; for example, the action of a human handing an object to another human, or a first person carrying a second person, etc.);
- group actions (such as activities carried out by a group of individuals; for example, the actions of a sports team on a field or court; the actions of a crowd of people as they enter a facility);
- behaviors (such as physical activities related to an individual's emotions, personality, and psychological condition, for example, shaking hands indicating a possibly friendly behavior, a person performing a task very differently than other individuals who perform that same task indicating a possible abnormal behavior, etc.); and
- events (such as high-level activities that describe social actions between individuals and indicate the intention or the social role of a person, such as the actions of a server at a restaurant who brings food to customers, etc.).

"Information processing system" as used herein is intended to be broadly construed, so as to encompass, at least, and for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments, as defined above. Some cloud infrastructures are within the exclusive control and management of a given enterprise, and therefore are considered "private clouds."

"Internet of Things" (IoT) refers at least a broad range of internet-connected devices capable of communicating with other devices and networks, where IoT devices can include devices that themselves can process data as well as devices that are only intended to gather and transmit data elsewhere for processing. An IoT can include a system of multiple interrelated and/or interconnected computing devices, mechanical and digital machines, objects, animals or people that are provided with unique identifiers (UIDs) and the ability to transfer data over a network without requiring human-to-human or human-to-computer interaction. Even devices implanted into humans and/or animals can enable that human/animal to be part of an IoT.

"Public Cloud" at least refers to cloud infrastructures that are used by multiple enterprises, and not necessarily controlled or managed by any of the multiple enterprises but rather are respectively controlled and managed by third-party cloud providers. Entities and/or enterprises can choose to host their applications or services on private clouds, public clouds, and/or a combination of private and public clouds (hybrid clouds) with a vast array of computing resources attached to or otherwise a part of such IT infrastructure.

"Sensor" at least refers to any type of a sensing mechanism or device configured to detect and gather a particular type of information, such as an image, an environmental condition (e.g., temperature, wind speed, humidity, etc.), movement, sound, a frequency or signal, a pressure, Sensors can include cameras and other imaging devices. Sensors can be configured to be fixed, movable, wearable, etc., and can also be embedded within other articles or can be implemented via systems, such as a position sensor in a mobile phone that a person carries, one or more sensors located in a vehicle, radio frequency identifier (RFID) tags attached to objects or devices and capable of being detected and/or read by readers, etc.

Unless specifically stated otherwise, those of skill in the art will appreciate that, throughout the present detailed description, discussions utilizing terms such as "opening", "configuring," "receiving,", "detecting," "retrieving," "converting", "providing,", "storing," "checking", "uploading", "sending,", "determining", "reading", "loading", "overriding", "writing", "creating", "including", "generating", "associating", and "arranging", and the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

In addition, as used herein, terms such as "module," "system," "subsystem", "engine," "gateway," "device,", "machine", "interface, and the like are intended to refer to a computer-implemented or computer-related in this application, the terms "component," "module," "system", "interface", "engine", or the like are generally intended to refer to a computer-related entity or article of manufacture, either hardware, software, a combination of hardware and software, software, or software in execution. For example, a module includes but is not limited to, a processor, a process or program running on a processor, an object, an executable, a thread of execution, a computer program, and/or a computer. That is, a module can correspond to both a processor itself as well as a program or application running on a processor. As will be understood in the art, as well, modules and the like can be distributed on one or more computers.

Further, references made herein to "certain embodiments," "one embodiment," "an exemplary embodiment," and the like, are intended to convey that the embodiment described might be described as having certain features or structures, but not every embodiment will necessarily include those certain features or structures, etc. Moreover, these phrases are not necessarily referring to the same embodiment. Those of skill in the art will recognize that if a particular feature is described in connection with a first embodiment, it is within the knowledge of those of skill in the art to include the particular feature in a second embodiment, even if that inclusion is not specifically described herein.

Additionally, the words "example" and/or "exemplary" are used herein to mean serving as an example, instance, or illustration. No embodiment described herein as "exemplary" should be construed or interpreted to be preferential over other embodiments. Rather, using the term "exemplary" is an attempt to present concepts in a concrete fashion. In addition, the articles "a" and "an" as used in this application and the appended claims should generally be construed to mean "one or more" unless specified otherwise or clear from context to be directed to a singular form.

Before describing in detail the particular improved systems, devices, and methods, it should be observed that the concepts disclosed herein include but are not limited to a novel structural combination of software, components, and/or circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

The following detailed description is provided, in at least some examples, using the specific context of an exemplary employee and workplace and modifications and/or additions that can be made to such a system to achieve the novel and non-obvious improvements described herein. Those of skill in the art will appreciate that the embodiments herein may have advantages in many contexts other than an employment situation. For example, the embodiments herein are adaptable to military environments, government operations, educational settings, and virtually any environment where a user wants to perform more effectively. Thus, in the embodiment herein, specific reference to specific activities and environments is meant to be primarily for example or illustration. Moreover, those of skill in the art will appreciate that the disclosures herein are not, of course, limited to only the types of examples given herein, but are readily adaptable to many different types of arrangements that involve monitoring interactions of an individual that involve voice, text, and/or video, analyzing the interactions, and making recommendations based on the analysis.

As noted previously, there is a need for a non-intrusive, personalized way to identify a worker's individual weaknesses in order to provide personalized training and help reduce injuries and other health risks, reduce negative impacts on a business, and improve productivity.

Various health and physical risks can arise when employees perform jobs in certain ways. Specific jobs are assigned to the worker, and the worker may continue to do the task with a particular habit, not realizing the health consequences until someone suggests the proper way to do the jobs. For example, such a particular habit can be sitting or standing in one position for an extended period of time, not drinking water on a regular basis, not taking appropriate breaks on the job, and/or any type of practice that requires more effort or energy to complete a task and is prone to health problems.

Impacts on a business or company can arise from the way employees perform tasks, as well. For example, a worker may receive standard training to perform a specific job with a particular tool. However, the worker may not be following the same guidelines while on the job and may be mishandling certain tools, which may lead to excessive wear, damage, loss, etc. These kinds of issues can lead to additional business problems and a significant impact on a company's business by causing a decrease in output, an impact on investment, a loss of raw materials, a drop in sales, low worker morale, a loss of brand reputation, and, at worst, worker inability to work for a lifetime due to injuries.

Worker productivity also can lead to significant impacts to business, as well. For example, a worker may be spending more time on a specific task, not taking regular breaks, focusing on non-relevant tasks, and being interrupted while on the job. All of this has an effect on worker productivity, lowering output and harming the company's bottom line.

In certain embodiments, arrangements are provided that enable a user, such as an employee or worker, to have a digital companion/coach configured to provide personalized assistance and improvements for that worker, based on monitoring of worker job habits, task performance, and/or physical movements, which arrangements are able to track, trace, analyze, recommend, and share regularly or on-demand basis. In certain embodiments, systems, methods and devices are provided that are configured for performing one or more of the following advantageous functions:

Detecting, tracking, and recording various types of user activities, including but not limited to movements, gestures, physical tasks, interactions with tools, etc.;

Tracking and tracing the time spent at work on tasks and other user activities;

Sending details on what is tracked to a centralized server;

Classifying and analyzing user activities to help improve a user's performance, improve efficiency, reduce injuries, improve personal effectiveness;

Analyzing the time or slot to complete a given task;

Analyzing visual information (information tracked via cameras and/or sensors) to find employees' sentiments, emotions, etc.;

Generating one or more outputs, such as reports, that are configured to allow the user (e.g., a worker and/or supervisor) to view their tasks and other various activities in the organization in an organized way;

Generating one or more outputs, in the form of customized recommendations, where the recommendations can include one or more of recommendations for improvements in worker activities to improve performance, improve efficiency, reduce injury, recommendations for training and/or equipment that will help improve worker effectiveness, etc.;

Configuring one or more systems to be set up to implement some or all of the recommendations for the worker and/or in connection with worker actions, such as controlling equipment or machines with which a worker interacts to compensate for issues resulting from worker activities, automatically scheduling worker tasks and actions (e.g., training) on a calendar, filling out forms to enroll in worker training, linking or devising training to improve skills and/or reduce injuries, downloading or linking to recommended reading, etc.;

Securely persisting worker data and analysis of worker data with encryption and providing access the encrypted data by decrypting using a private key that is associated with the worker; and Configuring sharing of worker data, in accordance with worker requirements and preferences, such as sharing worker data with managers, supervisors, coaches, and/or mentors in the form of an assessment or development.

In at least some embodiments herein, an intelligent agent is proposed that includes features (including but not limited to video analysis, sensor input processing, gesture/movement recognition and analysis, etc.) which are configured to help to analyze the time an employee spends on tasks and to analyze how an employee performs tasks and other user activities, with a goal of improving efficiency and effectiveness and reducing injury at work.

In at least some embodiments, unlike many currently available intelligent personal assistant products and workplace surveillance products, a tool is provided that gives an employee or worker complete control over the tracking of the worker's activities and generating the associated analytics about those activities. In certain embodiments, the worker has the ability to enable and disable sharing of analytics and other information, including time spent on projects, user activities and movements, etc., with the worker's leaders, supervisors, and/or subordinates. In at least some embodiments, an intelligent worker assessment engine is provided that enables self-management, self-control, and self-evolution.

In certain embodiments, an arrangement is provided that includes a personal effective domain and user-specific agent that learns and builds expertise by shadowing its master (e.g., a user, such as a worker), tracking the movements, gestures, and other actions of the user/worker, and recommending actions for the employee based on the tracked information. By using this evolved intelligence, the worker productivity and effectiveness can be exponentially increased, while reducing chances of injury while performing tasks at work.

At least some embodiments herein are configured to extend virtual assistant and robotic automation capabilities to include a person/individual specific and targeted tasks as configured and learned from the behavior of that person over a period of time. These new tools, part of a system that is referred to herein as an Intelligent Worker Assessment Engine (IWAE), spearhead the innovation in the next generation of employee engagement. In certain embodiments, the IWEA uses images of recorded use activities, such as surveillance camera images, to uncover patterns of employees' behavior at work and compares them to trained image data to warn and recommend health-related, smart work intelligences behavior to workers. In certain embodiments, this is accomplished by constructing a core component that builds a trained detected component, including an image store of bad health, and smart work analysis, which is artificial-intelligence (AI)-powered, that learns over time in the context of a worker. This is explained further herein.

The IWAE, in at least some embodiments herein, go beyond the general-purpose digital personal assistants and employee experience platforms to provide a system having intelligent personal effectiveness capabilities that are specifically configured and learned for and about the configured person. This is achieved by initially, in some embodiments, by configuring the IWAE and any associated digital assistant, with general-purpose and domain-specific entities for the user, employee and/or person who is using it. Over time, these assistants accumulate the person's domain expertise as they are associated with every task the person performs in a specific environment, such as on the job.

The idea of intelligent personal effectiveness, in certain embodiments, uses the capabilities of machines and computers (including, in some embodiments, any type of device that is connected using the Internet of Things (IoT)), including devices and/or sensors that are interconnected using computer networks, the cloud, etc., to access information associated with user activities of a worker, included recorded visual information associated with worker movements, task performance, etc., to help understand individual worker's performance and habits. In certain embodiments, the IWAE has a task of maintaining and managing data about a given worker, including data relating to physical movements and task execution by that worker, and in certain embodiments the IWAE can perform the same data maintenance and management functions for a group of workers, as discussed further herein.

A part of this functionality is the IWAE's ability to understand and express itself in natural language and in user-accessible images, as part of a report to a user or a user's supervisor, thus creating an intuitive way for the employee/person to perform tasks, including physical tasks and actions that are part of job responsibilities, and get feedback on the quality of performance of those tasks, including recommendations on how to improve performance to reduce injury and increase efficiency.

In certain embodiments, an innovative and unique approach to virtual assistants and digital personal assistants is provided, by providing a system that includes an arrangement for training virtual assistants individually to support and monitor a specific worker, including via accessing information from one or more cameras and sensors that are able to detect, monitor, and/or track one or more worker activities and obtain information about the worker activities, and perform individual analysis and provide recommendations based on the information obtained about the worker activities, enabling the virtual or digital personal assistant to serve as an individual knowledge worker for the worker. In certain embodiments, these features are achieved by implementing a core component to build a knowledge repository as an expert system by learning over time in a worker context. Advantageously, in certain embodiments, the knowledge repository recommends decisions for the worker in terms of communications, recommendations, and actions that are very specific to the worker's context and worker activities (e.g., to the specific context of an employee in a company, or a student at a school, etc.). Advantageously, in certain embodiments, the knowledge repository recommends certain worker actions and provides necessary controls to help implement those actions, including automatically, on behalf of a worker or in cooperation with the worker, optionally without requiring worker to take action. Additional aspects of the embodiment herein include components that are responsible for understanding the task execution context, identifying the intent and sentiment associated with worker activities and interactions' intent and sentiment, and leveraging the knowledge expert system recommendation and suggested actions.

In certain embodiments, as noted above, an Intelligent Worker Assessment Engine (IWAE) is proposed that is configured to recognize, detect, track, record, and analyze, movements and gestures of an object, such as a human worker, with a focus on assessing behaviors for determination of various undesired behaviors, issues, and conditions, including but not limited to behaviors/conditions/issues, such as:

1. An inefficient working style that leads to delays and non-optimized use of resources, in contrast to an efficient working style that aids in the completion of tasks on time and/or with optimized usage of resources, in contrast to;
2. Abnormal or non-typical behavior and/or task performance that endangers the worker's health and/or increases the chance of injury to the worker or to others; and
3. Ways of handling or using tools and equipment that may lead to frequent repair or maintenance.

The IWAE, in certain embodiments, includes a centralized engine that uses gesture recognition technology to detect individual workers' actions and behaviors that differ from expected, advantageous, optimal, or safe behavior using existing sensors (e.g., camera systems, video surveillance equipment, etc.). In certain embodiments, the IWAE examines the time it takes the worker to accomplish the task, as well as the worker's behavior during task execution and the worker's location over time.

In certain embodiments, the IWAE is configured to stream images from various types of cameras and image capture devices (e.g., surveillance cameras) installed in the workplace and detects objects (e.g., human workers performing tasks) by normalizing the image and extracting the feature value. The abnormality detection corpus is used in the recognition process to determine normal/abnormal parameters and ranges, for a given worker activity. In addition, in certain embodiments, the IWAE measures the time it takes a worker to complete a task, performs a comparative analysis over time, and recommends the best pattern or gesture for smart work that is completed on time, in safe manner, and/or recommends ways to optimize or change actions, gestures, and movements, to achieve optimum and safe performance.

FIG. 1 is an exemplary reference architecture of a system 100 providing artificial intelligence (AI) powered worker productivity and safety, via an Intelligent Worker Assessment Engine (IWAE) 202, in accordance with one embodiment. The system 100 of FIG. 1 includes, in some embodiments, an IWAE 202 that is in operable communication with one or more sensors 203 (e.g., a camera), which is configured to monitor worker activities 201 of a worker 303. The system 200 also includes a database of training information 205, including a training data set 206. The IWAE 202 generates a process output 204, discussed further below.

The IWAE 202 receives streamed video/images 208 from one or more sensors 203 and provides the streamed video/images 208 to an image/video processing system 212. The IWAE 202 also includes a detection object corpus/repository 210 that is in operable communication with the image/video processing system 212. The IWAE 202 also includes a recommendations engine 220, which is in operable communication with the image/video processing system 212, where the recommendations engine 220 generates the process output 204. The process output 204 may include, in various embodiments, information and/or reports associated with: one or more of a worker health assessment summary 222, a pattern of smart work 224, worker/personal analysis and recommendations reporting, time effectiveness 228, feedback classification 230, industry content crawlers (optional) 232, training content recommendation(s) 234, and controls/assists for one or more user tasks (optional) 236. These reports and other outputs are discussed in greater detail herein.

One unique aspect of the system 100 is its behavior analysis and detection features that are used during human activity/behavior recognition and analysis. These features, in certain embodiments, are implemented as part of the image/video processing system 212. As defined previously, human activity recognition and/or human behavior recognition (HAR/HBR) includes methods of extracting and predicting the movements of the human body, using a machine or device such as a camera or sensor-based device. In certain embodiments herein, systems, methods, and devices are provide that implement and adapt HAR/HBR techniques to correctly classify input data, such as image and video streams and other data recorded that has tracked human movements and actions, into a pertinent category, analyze the data to determine whether the behavior may be inefficient, harmful, or otherwise undesirable, and then attempts to make recommendations based on a comparative analysis, such as with a data set (e.g., a training data set) of preferred, normal, and/or desirable behaviors. This is described further below.

Human behavior recognition, in some instances in embodiments herein, is primarily based on whole-body motion characteristics. The limb motion-based hierarchical discriminative approach is one type of approach to human behavior recognition. In some embodiments, the limb motion-based hierarchical discriminative approach is part of the family of so-called part-based models of the human body, which are configured to represent a human body as a constellation of a set of rigid parts (e.g., torso, head, half limbs) that constrained in some manner, as is understood in the art. For example, adjacent body parts can be subject to tree-structured kinematic constraints between adjacent body parts. In some implementations, part-based models for body parts can include information such as what a body part should look like in an image and how body parts are arranged relative to each other. Various computer vision applications that involve humans use part-based models, such as human parsing, kinematic tracking, action recognition, and human-object interaction. In certain embodiments herein, in the hierarchical manifold space, feature extraction is combined with mutual motion pattern analysis and discriminative behavior modeling. Data from direct motion capture and behavioral analysis, in some embodiments, is based on synthetic human body images.

Figure 3:
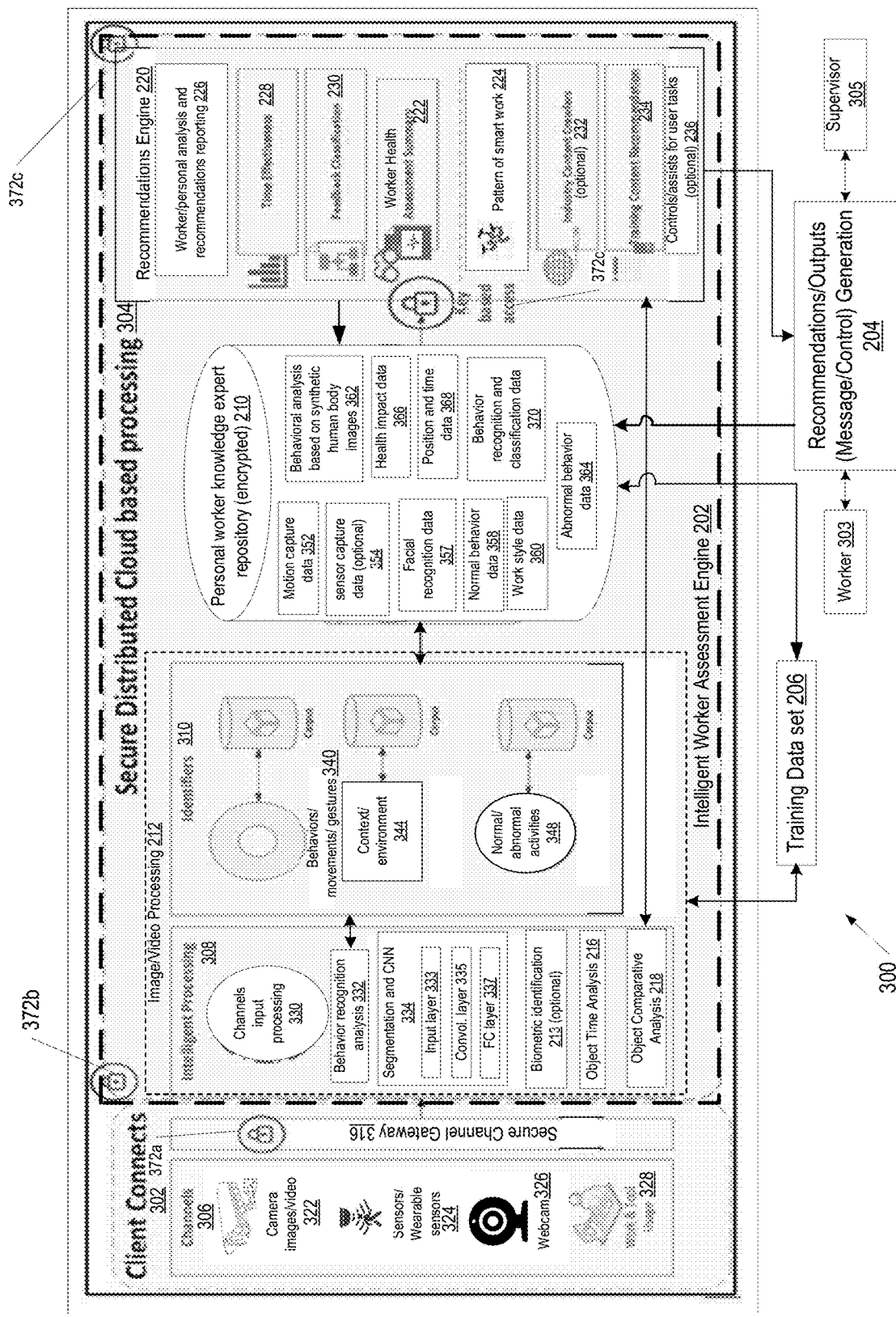
FIG. 3 is a more detailed view of the exemplary reference architecture of FIG. 1, in accordance with one embodiment.

Another unique and advantageous aspect of the embodiments herein, as shown in FIG. 1, is the detection object corpus or repository 210 (also referred to herein and in FIG. 3 as the personal worker knowledge expert repository 210). For each human state (e.g., an activity, behavior, gesture, atomic action, interaction, etc.), a normality/abnormality detection dictionary is generated based on the accumulated feature values. The accumulated feature values can come from various sources, including from streamed video/images 208 or other monitored user/worker activities, taken from the same individual or group of individuals being monitored, or from others. For example, a given individual may perform a task in a proper, normal, and healthy manner at certain times, and in a rushed, improper, and/or unhealthy manner at other times, so in some instances, the images in the "Normal" behavior data (in the detection corpus or repository 210) were of "regular" working styles for that same individual. In other examples, the images in the normal behavior data may be of a second individual (or group of individuals, as applicable) with whom a first individual or first group of individuals, as applicable, is being compared.

For example, FIG. 2A and FIG. 2B illustrate examples of the types of images that might be contained in the detection corpus or repository 210, where the images are further processed and analyzed, as discussed herein, including via comparisons to the streamed video/images 208, to help provide recommendation. It will be understood that, in some embodiments, the actual images would be images of actual human workers; the representations in FIGS. 2A and 2B are meant to be exemplary of the types of images. FIG. 2A is a first exemplary illustration comparing normal and abnormal worker movements in lifting an object, in accordance with one embodiment. FIG. 2B is a second exemplary illustration comparing normal and abnormal worker movements in lifting an object, in accordance with one embodiment.

The "regular" working style, in some embodiments, includes distinct motions such as right/left-hand operation, bending the body in the correct position, motion putting down the hands and turning, and so on. As noted above, the HBR/HAR methodologies, as implemented in the image/video processing system 212, analyze aspects of the distinct motion, including whole-body motion and limb motion, to help discriminate between any type of desired behavior, action, activity, etc., and undesired behavior, action, activity, etc. What is classified as "desired" vs "undesired," can, of course, vary based on the application. In some instances, behavior can be "undesired," if it has the potential to cause physical harm (either one time or over time, e.g., with repetitive stress), or if it is performed inefficiently, or if it is performed incorrectly, or if it is causes damage to tools, equipment, or other material things, or if it is simply being done in a very abnormal and unusual way (for example, an employee tries to perform two tasks at the same time when only one should be done at once).

Depending on a given application, in certain embodiments, "undesired" or "abnormal" behavior also can include behavior that may seem out of place, uncommon, suspicious or irregular. For example, a given behavior that might appear to be normal at certain times (an employee using a forklift to take a container out of a building and transfer it to a truck), may be performed perfectly, efficiently, and properly—but may still be classified as abnormal, irregular, and/or suspicious because of its context. As an example of a "normal" seeming activity that may become "abnormal" based on context, consider that aforementioned forklift the task may be being performed by an employee who is not supposed to be performing that task, or is not trained to perform that task, or that the task may be being performed at a time when a facility is supposed to be closed and no one is supposed to be working. Thus, systems such as the system 100 can be advantageous to detect and/or analyze, at times, human behavior and activities that may require further attention and review to ensure that there are legitimate reasons for behavior that may be normal under certain circumstances and abnormal in other circumstances.

As will be appreciated, the complexity of human behavior can increase the challenges in performing automated classification and analysis of human activities and behaviors. Because different individuals may perform the same task quite differently, it can be helpful to use systems such as that in FIG. 1 to help assess what human activities and task performance can be determined to be desired or "normal," and what is not. It also can be quite challenging to perform accurate and precise classifications due to the fact that human behavior is quite complex. Therefore, it is desirable to use intelligent techniques or methods, as discussed herein, that are capable of learning what normal behavior is and then it should be able to distinguish between normal and abnormal behavior.

Referring again to FIG. 1, another unique component of FIG. 1 is the recommendations engine 220. The recommendations engine 220, in certain embodiments, analyses worker behavior by categorizing and documenting the time spent on various activities/tasks completed by the worker during a specific time period. For example, in one embodiment, the recommendations engine 220 uses information based on processed raw data record. As part of this process, in certain embodiments, the recommendations engine provides a comparison of the workers' work methods and routines, as well as their behavior and time spent, where the comparison not only may look at things like normal vs abnormal, but also may look at various ways of performing tasks even in a "normal" way, such as time spent on different parts of a task. In certain embodiments, the recommendation engine 220 generates an assessment summary and visualizes the workers' time spent with appropriate behaviors based on this feature detail and segmented features, as explained further herein. As noted herein, human activities and behavior, including in the training images in the detection corpus or repository 210, also can be used to evaluate efficiency and productivity. For example, FIG. 2C is an exemplary illustration showing images of healthy human behavior, but with more time taken to lift an object, in accordance with one embodiment. FIG. 2D is an exemplary illustration showing healthy human behavior with less time taken, in accordance with one embodiment.

FIG. 3 is a view of an exemplary system that provides a more detailed view of the exemplary reference architecture of FIG. 1, in accordance with one embodiment. The system 300 of FIG. 3 also provides a representation of the system 100 of FIG. 1 as implemented in an exemplary cloud-based environment. The system 300 of FIG. 3, includes a set of client connects 302 to a secure distributed cloud based processing system 304. The secure distributed cloud based processing 304 generates recommendations/outputs such as process output 204, which may be provided to a user/worker 303 and/or a supervisor 305, in multiple ways, such as upon request, periodically, upon the occurrence of specific events (e.g., as part of an annual review of activity, when an abnormal activity is detected, when an improvement in activity is detected, etc.). The secure distributed cloud based processing 304 also is in operable communication with the set of training data set 206, In certain embodiments, the training data set 206 also may be part of the secure distributed cloud based processing 304, as will be understood.

The set of client connects 302 includes, in certain embodiments, a set of channels 306 for receiving inputs, and a secure channel gateway 316 for communications between the channels 306 and the secure distribute cloud based processing 304. The set of channels 306 includes, in certain embodiment, various sources of inputs related to a user's activities, especially physical performance of tasks. For example, set of channels 306 in the embodiment of FIG. 3, includes information from camera images/video 322, from sensors 324 (optionally including wearable and/or mounted sensors), from webcams 326 and from work and tool usage 328. Information from work and tool usage includes, for example, information indicative of how user interacts with a tool, machine, device, etc. For example, information associated work and tool usage 328 may include information such as:

- information accessible from any type of an Internet of Things (IoT) connected tool, device, system, vehicle, etc.;
- information stored in vehicle a user operates (e.g., a truck, car, forklift, construction equipment, etc.) indicating how a user interacts with that vehicle, such as how hard a user brakes, how fast a user drives, whether an appropriate sequence of events takes place before a user initiates a particular action, whether a vehicle is operated properly in certain environmental conditions, etc.);
- information stored on a computer, portable mobile computing device, wearable sensor (e.g., so-called "smart watch", etc.) indicative of a user position at a given time, a user elevation, a user speed, a number of keystrokes or swipes of a user, whether a user is actively using a feature on the device while performing another task (e.g., is a user on a cell phone or listening to in-ear headphone while operating a crane, etc.); how hard a user is pressing buttons or keys on a device, how fast a user is providing inputs, etc.; and
- information derived from sensors or labels attached to tools, workpieces, items being worked on, etc., that can reveal how a tool, workpiece, item being worked on, etc., was being handled by a user, where the tool, workpiece, item being worked on etc., was brought while a user was working on it (did a user take a tool and leave it in the rain while taking a meal break, for example), etc.

The information from the various channels also can be used individually and/or in combination (e.g., by the intelligent processing, discussed further herein), to help reveal or add information relating to the source of problems even if, at first glance or analysis, physical activities, as recorded by one camera, do not by themselves reveal the source of an issue, such as those that might take place on a manufacturing line. The activities recorded and analyzed by one camera, in combination with other information that is known (e.g., from historical information in the personal worker knowledge expert repository 210) or that is derived from other recorded information, may help to improve analysis and result in improved or more accurate recommendations/outputs, such as process output 204.

For example, a streamed video from camera images/video 322 may show a first worker performing a task (e.g., running a mixing process on a manufacturing line) in a first accurate, efficient, and physically safe manner at a first time, during a first shift. Later, on second shift, a second worker may appear to be performing the same task with equal fidelity (i.e., as accurately, efficiently, and as physically safe as the first worker did during the first shift), but the same mixing process results in a failed product. Data from the multiple channels, as processed as described herein, may show, effectively, some other event or action that, in combination with the worker actions during the task, may cause the failed product. For example, data from a different camera, or from a device itself, may show that either the first shift employee or second shift employee may have neglected to perform a certain replacement or maintenance action on the equipment, prior to performing the actual running of the mixing process, use, which may have led to the failure even when it "appears" that the mixing process was performed correctly. The system 300 herein can help to detect these issues from analyzing streamed information together and help formulate recommendations and training to prevent the issues in the future.

The secure channel gateway 316, in certain embodiments, secures information sent from the channels 306 via a first encryption key 372a, and a corresponding second encryption key 372b in the secure distributed cloud based processing 304, is used to decrypt the information. For example, in certain embodiments, the first encryption key 372a is a private key and the second encryption key 372b is a public key, where a worker or other user creates the private key and services running on the IWAE 202 use the public key while encrypting worker data before persisting the data in the personal worker knowledge expert repository 210, while another private key 372b can be used to decrypt the repository data, as needed, for the recommendations engine 220 to make recommendations via process output 204.

The secure distributed cloud based processing 304, in certain embodiments, includes components similar to the system 100 of FIG. 1, including the image video processing 212, the personal worker knowledge expert repository 210, and a recommendation engine 220, which together form the intelligent worker assessment engine (IWAE) 202.

The image/video processing system 212 includes an intelligent processing system 308 and a set of identifiers 310. The intelligent processing 308 includes a channels input processing system 330, a behavior recognition analysis system, a segmentation and convolution neural network processing system 334, an object position time analysis engine 216, an optional biometric identification system 213, and an object comparative analysis system 218. These are explained further herein. The identifiers module 310 is configured to parse and identify/recognize activity identifiers such as behaviors, movements, and gestures 340, context/environment 344, and normal/abnormal activities 348, to help the behavior recognition analysis 332 to interpret the actions, gestures, behaviors, etc., based on information in the personal worker knowledge expert repository 210, on the training data set 206, and on other known information, such as data about behaviors movements/gestures 340, data about the context/environment 344 in which user activity took place, and information about normal and abnormal activities 348.

The channels input processing system 330 is configured to determine the type of user activity input being received (e.g., image or video, sensor inputs, work and tool usage, etc.) and apply analysis to extract appropriate information that is taken into account by the recommendations engine 220 to make recommendations. For example, for information other than images/video, appropriate analysis of the corresponding data (e.g., time stamps for sensor data, tool usage data, etc.) can be correlated to information seen on an image. This is shown further in the table of FIG. 8, discussed further herein. As will be appreciated, the types of channel inputs shown in FIG. 3 are illustrative and not limiting, and the types of inputs can be adapted based on the desired application to include many different types of custom and/or industry specific interactions could include specific tasks or actions that a user performs which can be monitored, such as driving, manufacturing, installation, repairs, sales, cleaning, coding, treating, performing, traveling, entering data or information—virtually any documentable occupation or activity that includes some physical user activity aspect that can be quantified, recorded, and/or observed and reduced from a type of input form (e.g., video or image data, sensor data, machine data) to a form that conveys details about the way a user performed an activity. In certain embodiments, the IWAE 202 builds contexts and semantics based on the channel which records a user activity, along with context and other identifiers, for efficient processing (storage and retrieval) of knowledge and data from the personal worker knowledge expert repository 210. This processing, for example, can provide information about how many incidents or experiences of normal or abnormal activity a user has over a given time period or in a certain environment or context.

Although not shown in FIG. 1 or 3, it will be appreciated that, in certain embodiments, the given system 100 (FIG. 1) or system 300 (FIG. 3) optionally also may include additional components or subsystems configured to provide individual recognition of the individual it is monitoring, if necessary. For example, the image/video processing 212 optionally may include, in certain embodiments, a facial recognition system or other biometric identification system 213 that may be usable to determine or confirm the identity of an individual shown in a video stream or an image. Another identification may be via a badge or token worn on or carried by an individual. Still another means of identification may be a user logging into a system or an indication that a user is working a given shift and thus is the only individual who should be using a given piece of equipment or in view of a particular camera. Knowing an individual's identity can help to ensure that the recommendations/outputs (e.g., process output 204) are directed appropriately (e.g., to the correct worker 303 and/or supervisor 305).

For Worker 2, in contrast, the undesired outcome is not necessarily worker health, but impacts on the business or company, as shown by the information gleaned from the combination of monitoring a worker's actions, sensor data in the machine being used (information from the forklift regarding vehicle speed during the times worker used it, and fuel usage during that time), as well as (similar to Worker 1), information on tags in the cargo being moved. The analysis shows that Worker 2 is not operating the machine in an efficient way, which can have a negative impact on the company by costing it more in fuel costs and wear and tear on the forklift. Thus, the recommendations are specific to shut down the forklift between long delays in movement to save fuel. As the table 800 shows, some recommendations (e.g., those for Worker 5 and Worker 6) are based entirely on actions detected on video that are determined to lead to bad health or, in the case of Worker 5, actually led to a near-injury, and specific recommendations are listed to remedy these detected issues.

The recommendations engine 220 is configured to produce recommendations based on inputs from the channels 306 and on analysis in the image/video processing 212, including recommendations such as worker/personal analysis and recommendations reporting 226, time effectiveness 228, feedback classification 230, worker health assessment summary 222, pattern of smart work 224, optional industry content crawlers 232 (e.g., to provide recommendations), training content recommendation(s) 234, optional controls/assists for user tasks 236. The recommendations engine 220 provides outputs, such as messages or other usable forms of information to entities that can take action based on the information, such as to a worker 303 and/or a worker's supervisor 305.

The system 300 is configured to enable the intelligent worker assessment engine (IWAE) 202 (discussed further below) to leverage one or more intelligent engine and robotic automation capabilities to use data and information from one or more channels 306 (e.g., camera images/video 322) to detect and classify human activity and behaviors, to analyze it for whether it is normal/abnormal, to provide recommendations for improvements/changes if applicable, to continually learn and refine the analysis.

This specifically trained IWAE 202 is, in certain embodiments, configured to understand the employees' context, role, tasks, and goals, as well as what types of behaviors or actions have undesired results, health impacts, productivity impact, etc. In certain embodiments, the IWAE 202 is configured to help spearhead innovation in the next generation of employee/worker engagement. In certain embodiments, rather than being general purpose, the IWAE 202 is specifically configured to and learned from the configured person who is being monitored, so that it can serve as a virtual coach or assistant to help improve job performance of a monitored worker 303. Over time, in certain embodiments, the personal worker knowledge expert repository 210 accumulates a history of information and behaviors associated with an individual worker, to continually learn and provide feedback on the way the user is performing tasks. In some embodiments, the information from multiple separate worker knowledge/expert repositories 210 can be leveraged to provide a supervisor 305 with group-level knowledge about their employees or can be used to improve the information about each other.

The inputs to the IWAE 202 (e.g., client connects 302, training data set 206) and outputs from the IWAE 202 (e.g., recommendations/outputs such as process output 204), in certain embodiments, are communicated/provided via a computer network or via secure distributed cloud based processing 304. In certain embodiments, for example, the IWAE 202 resides on a server (not shown) that is remote from the channels 306, the worker 303 being monitored user 113*a* and/or the user device 112, as will be understood. In certain embodiments, communications between elements of the system 300 (as well as the system 100 of FIG. 1) also are implemented via secure distributed cloud-based processing 304, although it will be understood that some or all system components may be in operable communication in any usable way, including direct hard-wired connections, other types of computer networks, etc.

In certain embodiments, the channels input processing 330 of the image/video processing 212 is configured for facial sentiment analysis and for building one or more facial expression recognition models, where the video analysis is configured to interpret facial detection, dimension reduction, and normalization, including providing feature extraction from the face image and highlighting emotions by classification. The emotion information, in some embodiments, can be further used to interpret and classify detected user activity. For example, if a face shows an expression that may be indicative of an emotion of pain, difficulty, and/or discomfort, that expression may be indicative that a particular user activity is causing a health risk.

The recommendations engine 220 of the IWAE 202 is configured to pull together information from the image/video processing 212, the personal worker knowledge expert repository 210, and, optionally, derived from the training data set 206, to generate recommendations based on the user activities. The recommendations in the process output 204 can take several forms that include many different types of indicators and information including, but are not limited to, assessments, user reports, recommendations, graphical icons, graphical indicators, symbols, charts, images, videos, and/or feedback, with goals of helping a worker 303 and/or a worker's supervisor 305 to understand, analyze, and improve personal and professional user behavior and interactions, to meet personal effectiveness goals, reduce health risks, minimize company impact from undesired user activities, and/or improve worker productivity. Effectively, the IWAE is empowered to act as a personal assistant or coach to and for the worker 303, including helping the worker 303 with reminders and recommendations, ensuring the worker has appropriate training, and helping the user with feedback on the way the worker 303 is performing activities and other actions.

In certain embodiments, the IWAE 202 and its components are configured to take actions dynamically and/or continuously, with an ability to provide substantially real-time or immediate feedback to a worker 303, even providing an alert or an alarm while a worker is performing a task in a way to cause harm. In certain embodiments, the IPWE 202 and its components are configured to take actions periodically (e.g., at the end of each shift, once a week, once a month, quarterly, etc.). In certain embodiments, the IWAE 202 and its components are configured to take action on demand or request of a worker 303, supervisor 305, and/or another entity seeking the information. In certain embodiments, the IWAE 202 and its components is configured to take action upon the existence or occurrence of predetermined condition or event, such as a delay in work getting done, a product line rate of failure, a manufacturing problem, an increased volume of injuries or insurance claims, etc.

The worker personal knowledge/domain expertise repository 210 ("repository 110"), in certain embodiments, embodies the monitoring, capturing, and storing/retrieval of types of data about many aspects of worker tasks and activities ("user activities"), as discussed above. For example, information in the worker personal knowledge/domain expertise repository 210 can be automatically searched to provide information about how many times a worker has performed a task, how many times task performance has been normal or abnormal, other tracked data at the time of tasks, associated injury or insurance claims in the same time frame as tasks, any accidents or incidents related to an employee's task performance, output and efficiency data correlated to times that one or more employees were performing tasks, etc.). As will be understood, in some embodiments, there is a schema and ontology to start with when building this knowledge base in the personal worker knowledge expert repository 210, and the information therein builds gradually over a period based on the worker's interactions, activities, and actions.

In certain embodiments, the IWAE 202 is implemented in a "per worker" fashion, with each worker associated with a dedicated IPWE. In certain embodiments (not shown in FIG. 1 or 3), an IWAE 202 can include a plurality of repositories 210, wherein each repository advantageously is unique to a respective worker 303. This can be advantageous, for example, in embodiments where a given stream of information (e.g., set of images or videos) might include multiple workers, working independently and/or together, who each want to use the system 300 to improve effectiveness, reduce injuries, etc., such that the IWAE 202 can analyze, classify, and make recommendations for all participants based on the recorded interactions. Another example where an IWAE 202 can include a plurality of repositories may be for a supervisor 305 who wants to understand the performance of a group of employees they supervise, or to compare the performance of multiple different workers 303 who may be performing the same task at different times. In another example embodiment, there may be a single personal worker knowledge expert repository 210 that is configured so that repository data for each worker 303 or other user is included therein but is segmented. In an example of a recorded interaction containing multiple workers, the personal worker knowledge expert repository 110 would be updated for each attendee in their respective segment data.

The personal worker knowledge expert repository 210 is configured to natively embraces relationships of the various types of data stored therein with an associated worker 303. For example, motion capture data 352 of the worker 303 may be stored as chunks in the database. For example, in certain embodiments, the facial expression data 356 may include diverse expressions correlated with facial expression databases. In an example where a video stream includes the faces of more than one worker 303 and if a given personal worker knowledge expert repository 210 is configured to include segmented data for more than one worker (e.g., as noted above), the repository 210 can be configured to store each user's facial expression in their respective segment data.

Figure 4:
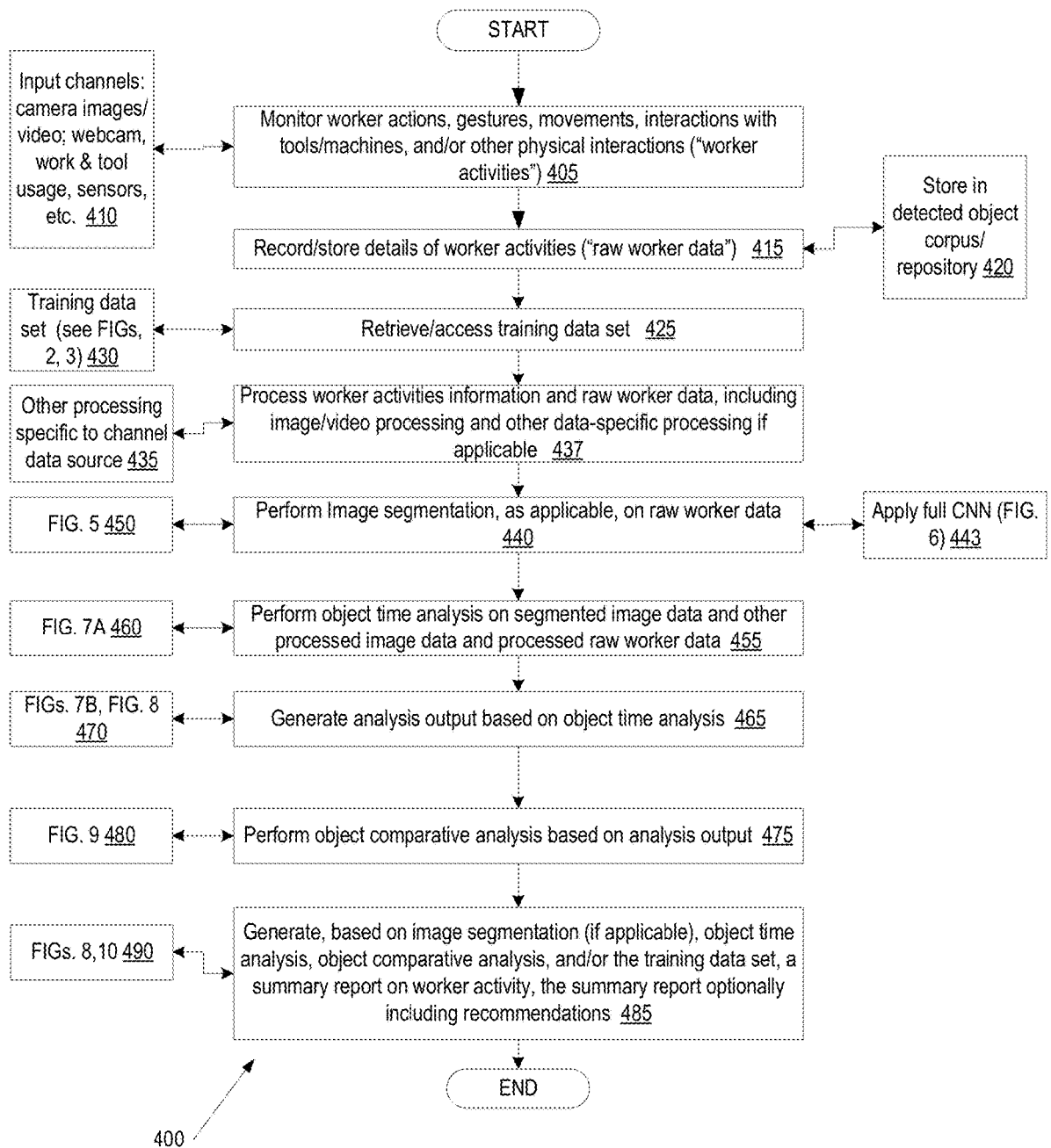
FIG. 4 is an exemplary flowchart showing operations of the system of FIG. 1 and FIG. 3, a high level, in accordance with one embodiment.

FIG. 4 is an exemplary flowchart 400 showing operations of the system 100 of FIG. 1 and the system 300 of FIG. 3, at a high level, in accordance with one embodiment. Referring to FIGS. 1, 3, and 4, in block 405 of FIG. 4, the IWAE 202 is configured to monitor one or more worker action, gestures, movements, interactions with tools/machines and/or other physical interactions ("worker activities"). Details of user interactions, activities, and/or content ("raw user data") for a given worker 303 recorded (block 415) and provided as a raw user data input to the IWAE 202, via storage in the detected object/corpus repository 210 (also referred to herein as the personal worker knowledge expert repository 210).

As noted above, in some embodiments, the worker activities can include information from multiple types of channels 306 and may, in certain instances, be part of streams of information from another worker, such as where both workers appear in the same video stream. A training data set is accessed (block 425), e.g., the training data set shown in FIGS. 1, 3) (block 430). Note, as well, that the training data set optionally may be accessed instead or again at a later time in this process, such as when needed during image processing (blocks 437-465) by the recommendations engine to perform object comparative analysis (block 475) and generate recommendations (block 475).

In FIG. 4, in certain embodiments, the analyses performed on the raw worker data, in certain embodiments, is tailored to the type of information contained in the data and the type of data. For example, if the data is image/video data, then blocks 437-475 take place, but if the data is not image/video data, or includes more than just image/video data, then block 435 also includes the actions of blocks 440-485. In block 437, worker activities information and raw worker data is processed, including image/video processing and other data-specific processing, if applicable. That is, in block 437, for non-image data (if applicable), other types of human activity recognition can be applied to the data. For example, sequences of sensor data (e.g., accelerometer data recorded by wearable sensors or by smart phones) can be classified into known well-defined movements, which can be used alone or in combination with other information from images and video, to analyze worker activity and movements.

Figure 5:
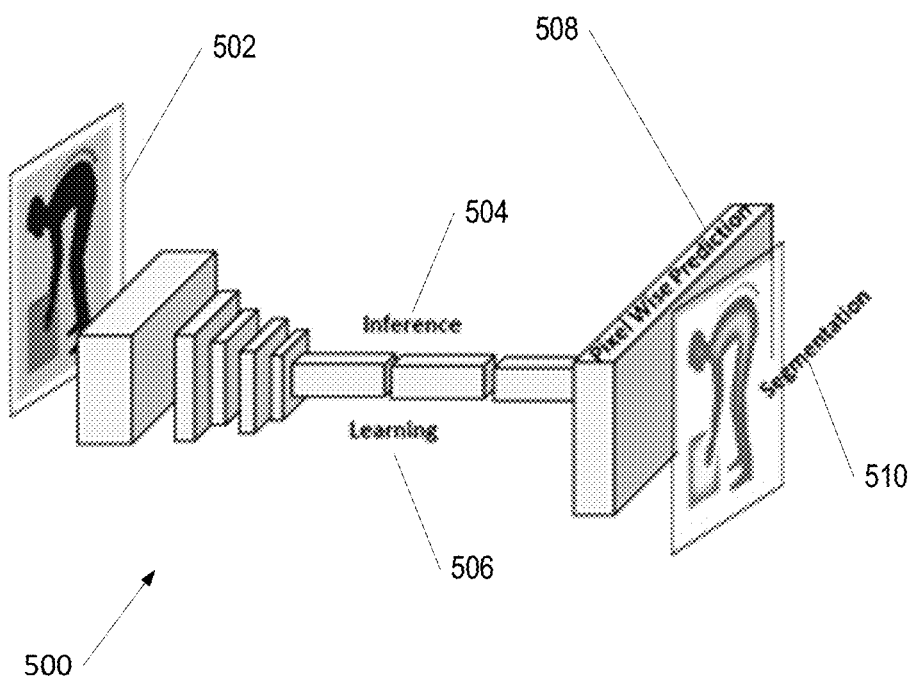
FIG. 5 is an example illustration representing segmentation on an image, in accordance with one embodiment.

In block 440, image segmentation, as applicable, is performed on the raw worker data. The image/video processing starts with performing image segmentation, which is illustrated via the example of FIG. 5 (block 450), which is an example illustration 500 representing segmentation of an image, from input image on the left side, to segmented output on the right. As is understood, segmentation of an image involves breaking a digital image into smaller portions ("image segments"), to help reduce image complexity for further processing or analysis. In segmentation, picture elements or pixels belonging to the same category are assigned a common label. Various types of segmentation are in use, including but not limited to. threshold based segmentation, edge based segmentation, region-based segmentation, clustering based segmentation, semantic segmentation, and artificial neural network based segmentation (e.g., convolution neural networks (CNNs)), any of which are usable in the process of FIG. 4. Advantageously, in the embodiments herein, fully convolutional neural networks are used in connection with the training data set 206, to help with learning worker behaviors, gestures, actions, etc., that are to be recognized in the image data.

As is understood, semantic segmentation is a deep learning algorithm that associates a label or category with every pixel in an image. It is used to recognize a collection of pixels that form distinct categories. Semantic segmentation includes three steps: classifying (classifying an object in an image), localizing (drawing a box or perimeter around the object that is found), and segmentation (grouping pixels in a localized image by creating a segmentation mask). As used with the embodiments herein, important aspects of segmentation in block 440 in the flowchart of FIG. 4 include learning one or more behaviors, gestures, etc., of a worker and semantic segmentation of an image containing a worker, with end-to-end, pixel-to-pixel action and speeding up learning and inferencing at the same time. Hence, a range of pixel-level problems with images can be solved using fully convolutional networks with a broad set of models.

Fully Convolutional networks are powerful visual models that yield hierarchies of features. The embodiments herein show that convolutional networks by themselves, trained end-to-end, pixels to pixels, exceed the state-of-the-art in semantic segmentation. A convent's data layers are each a three-dimensional array of size h×w×d, with h and w being spatial dimensions and d being the feature or channel dimension. The image is the first layer, with pixel sizes of h×w and color channels of d. Higher-layer locations correlate to their receptive fields, which are the areas in the image to which they are path-connected.

Translation invariance is the foundation of convents. Convolution, pooling, and activation functions operate on local input regions and are only dependent on relative spatial coordinates.

In certain embodiments, CNN will be used to do emotion classification as well as analysis of user activities such as physical activities. CNN is the most widely used architecture in computer vision techniques and machine learning. A massive amount of data is advantageous for training purposes to harness its complex function solving ability to its fullest. CNN uses convolution, min-max pooling, and fully connected layers, in comparison to a conventional fully connected deep neural network. When all these layers are stacked together, the complete architecture is formed. This is explained further herein. The flowchart of FIG. 4 applies a fully CNN process (block 443), in conjunction with image segmentation (block 440), as part of the image/video processing of block 435.

Figure 6:
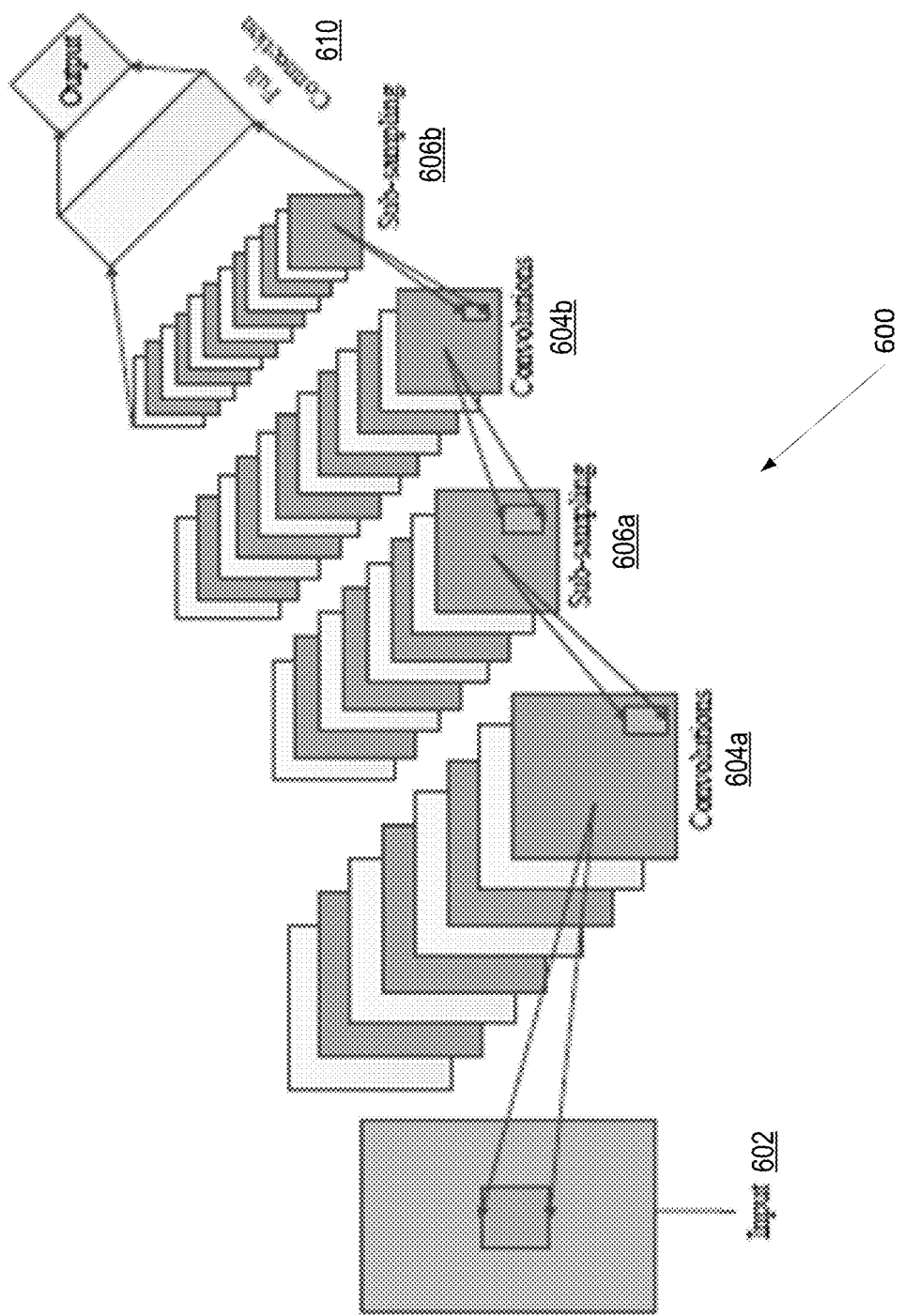
FIG. 6 is an example illustration showing a convolution neural network (CNN) architecture, in accordance with one embodiment.

For example, FIG. 6 is an exemplary architecture of a convolutional neural network (CNN) architecture 600, in accordance with one embodiment. The input layer 602 of the CNN contains the image pixel values. The first convolutional layer 604a convolves the l×l kernels with x feature maps of its preceding layer. If the next layer has feature maps, then n×m convolutions are performed, and n×m×(w×h×l×l) Multiply-Accumulate (MAC) operations are needed, where h and w represent the feature map height and width of the next layer (note that FIG. 6 shows two convolutional layers 604a, 604b, by way of example). An important function of the convolutional layers 604a, 604b is to calculate the output of all the neurons which are connected to the input layer 602. The activation functions such as ReLu, sigmoid, tan h, etc. aim to apply element-wise activation and to add the non-linearity into the output of the neuron.

The pooling layers (also referred to as sub-sampling layers 606a, 606b) are each responsible for achieving spatial invariance by minimizing the resolution of the feature map. One feature map of the preceding CNN model layer 604 corresponds to the one pooling layer 606 Z (e.g., either 606a or 606b). Thus, FIG. 6, as an example, depicts two convolutional layers 604 and two sub-sampling (pooling) layers 606a, 606b.

1) Max Pooling: It has a function u(x,y) (i.e., window function) to the input data and only picks the most active feature in a pooling region. The max-pooling function is as follows:

$$a_j = \max_{N \times N}(a_i^{n \times n}) \, u \, (n, n)) \qquad (1)$$

Pooling region. This method allows top-p activations to pass through the pooling rate. Here p indicates the total number of picked activations. If p=M×M, then it means that each and every activation through the computation contributes to the final output of the neuron. For the random pooling region Xi, we denote the nth-picked activation as $act_n$:

$$act_n = \max(X_i \theta \Sigma_{j=1}^{n-1} act_j) \qquad (2)$$

where the value of n 2 [1,p]. The above pooling region can be expressed below, where the symbol θ represents removing elements from the assemblage. The summation character in Eq. 2 represents the set of elements that contains top1 (n−1) activation but does not add the activation values numerically. After having the top-p activation value, we simply compute the average of each value. Then, a hyperparameter _ is taken as a constraint factor that computes the top-p activations. The final output refers to:

$$\text{output} = \sigma * \Sigma_{j=1}^{p} act_j \qquad (3)$$

Here, the summation symbol represents the addition operation, where σ∈(0,1). Particularly, if σ=1/p, the output is the average value. The constraint factor, i.e., σ can be used to adjust the output values.

The fully connected (FC) layer 610 is the last layer of the example CNN architecture 600. It is the most fundamental layer which is widely used in traditional CNN models. As it is the last layer, each node is directly connected to each node on both sides. As shown in FIG. 6, it can be noted that all the nodes in the last frame of the pooling layer 606b are converted into a vector and then are connected to the first layer of the fully connected layer 610b. There are many parameters used with CNN and need more time for training. The major limitation of the FC layer 910 is that it contains many parameters that need complex computational power for training purposes. Due to this, in this example the processing tries to reduce the number of connections and nodes in the FC layer 610. The removed nodes and connections can be retrieved again by adding the new technique named the dropout technique.

Fully convolutional networks are a diverse class of models, with modern classification convents being a subset. Recognizing this, extending classification nets to segmentation and improving the architecture with multi-resolution layer combinations significantly improves the state-of-the-art while simplifying and speeding up learning and inference.

Referring again to FIG. 4, after image processing is complete (blocks 435-450), object time analysis is performed on the segmented image data and other processed image data and processed raw worker data (block 455). In this block, the data segmentation with the aforementioned FCN continuously analyses the object (i.e., the human in the image and/or the specific limb positions, actions, gestures, or other activities of interest) and records the position(s) that affects the health of the work at regular intervals. If a specific object remains in the same position, the object position time analysis engine 216 (FIG. 2) is able to inform an appropriate entity (e.g., an organization or business, a supervisor) about the worker's health. There are many ways to represent the information generated in block 455. For example, FIG. 7A is a first example table 700 of object position time information for two example workers, in accordance with one embodiment. The table 700 records positions that impacts the worker's health. The table 700 shows, for example, that over four different days, "Worker1" has spent eight total hours in a hunched over position and three hours hunched over while lifting objects. As is understood, these types of positions have a potential for impacts on health, potential back injuries and muscle strains, etc.

Referring again to FIG. 4, in block 465, an analysis output is generated based on the object time analysis of block 455, such as the analysis output of FIG. 7B and/or FIG. 8 (block 470). These types of analysis outputs are illustrative and not limiting; depending on the application, many different styles and types of analysis output are possible, as will be understood. The analysis output is as follows for organizations or employers to act with recommendations on the position's level of effect. In certain embodiments, generation of the analysis output uses a recurrent neural network (RNN) algorithm with long-term short-term memory (LSTM). As is understood, use of RNN with LSTM is advantageous for processing of employee image data gathered over time, because RNN is well suited for analyzing temporal, sequential data, such as text or videos and LSTM is well-suited to classify, process and predict time series given time lags of unknown duration. The analysis output, in certain embodiments, uses a different corpus (not shown) that contains the text to be developed and the associated words/tokens to be matched to detected physician concerns. FIG. 7B is an example illustration of an analysis output 750, generated by the system of FIGS. 1 and 3, using the method of FIG. 4, in accordance with one embodiment. As FIG. 7B shows, the data of FIG. 7B has been analyzed to determine, for each of 8 workers, what the system has shown about their working style over a predetermined time period.

For example, FIG. 7B shows that, for Worker1, Worker5, Worker7, and Worker8, the activities monitored and processed in accordance with blocks 405-465 of FIG. 4, over the time period of interest, are activities that lead to bad health, and this is designed with the diagonal shading level (which is shown as diagonal shading for purely illustrative purposes, to differentiate from other levels with different shading.) The report 750 of FIG. 7B can be a quick summary for a supervisor 305, for example, who can view the activities of many employees at a glance (e.g., on a phone or computer display), to determine, which of their workers have activities that lead to bad health during that shift. The report 750 of FIG. 8 also shows, for example, that Worker4 has no symptoms (as indicated by dark shading) and that Worker2 and Worker6, with white shading, have no symptoms or early symptoms and that their working position needs to be changed.

FIG. 8 is an example table 800 of a combined analysis output and set of recommendations, generated by the system of FIGS. 1 and 3, using the method of FIG. 4, in accordance with one embodiment. As can be seen, FIG. 8 includes similar information to FIGS. 7A, 7B, but includes information from additional sources, such as sensors and tools/machines a worker uses, and also includes natural language recommendations (which can be generated based on combinations of information, history, etc., using the neural networks, as will be understood in the art). For example, for Worker 1 in the table 800 of FIG. 8, it can be seen that the information is similar to what was detected for Worker 1 in FIG. 7A, for the same date, with the same coded level, but the analysis output is more detailed and takes advantage of the additional sensor data (i.e., sensor information read off of bar code or other types of tags attached to boxes). The analysis output provides more explanation about the "whys" behind why the position of Worker 1 can lead to bad health ("Employee position can lead to muscle strain"). The analysis output provides specific recommendations to the worker 303 ("Position should be changed to reduce injury") and supervisor 305 ("show recommended position to user"). In addition, the analysis output lists a business impact, if any ("efficiency is OK").

For Worker 2, in contrast, the undesired outcome is not necessarily worker health, but impacts on the business or company, as shown by the information gleaned from the combination of monitoring a worker's actions, sensor data in the machine being used (information from the forklift regarding vehicle speed during the times worker used it, and fuel usage during that time), as well as (similar to Worker 1), information on tags in the cargo being moved. The analysis shows that Worker 2 is not operating the machine in an efficient way, which can have a negative impact on the company by costing it more in fuel costs and wear and tear on the forklift. Thus, the recommendations are specific to shut down the forklift between long delays in movement to safe fuel. As the table 800 shows, some recommendations (e.g., those for Worker 5 and Worker 6) are based entirely on actions detected on video that are determined to lead to bad health or, in the case of Worker 5, actually led to a near-injury, and specific recommendations are listed to remedy these detected issues.

Figure 9:
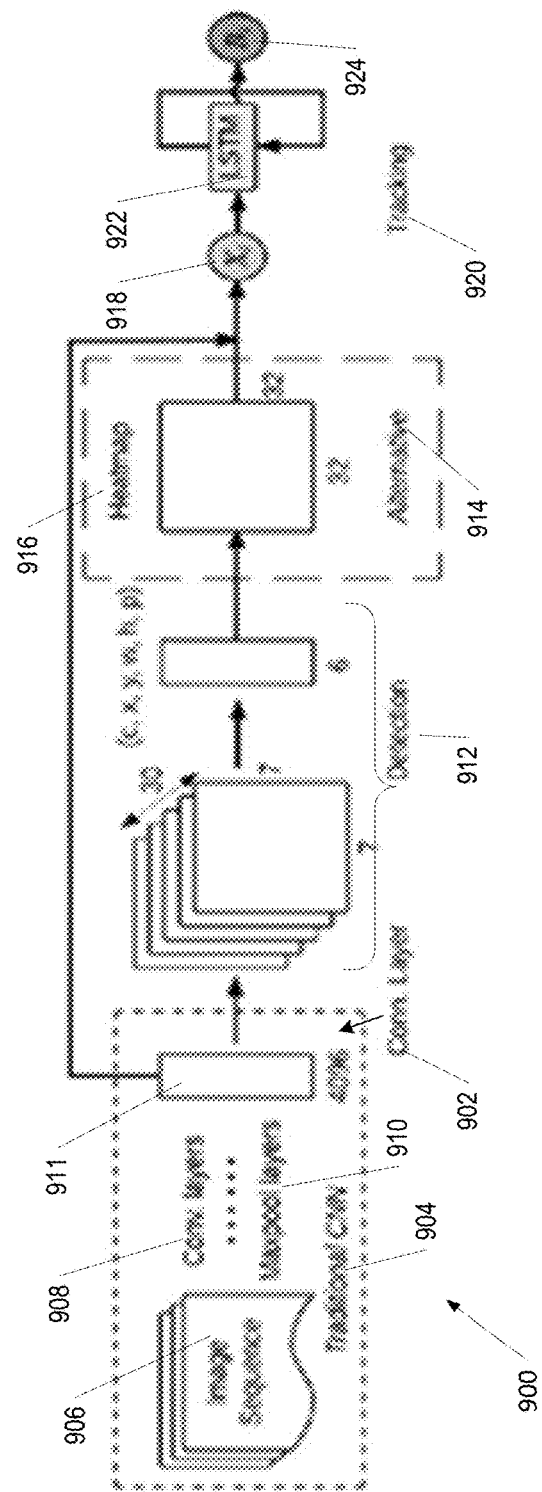
FIG. 9 is an example architecture for comparative analysis of worker behavior, in accordance with one embodiment.

Referring again to FIG. 4, in block 475, an object comparative analysis is performed based on the analysis output, such as shown in FIG. 9 which is an example architecture 900 for comparative analysis of worker behavior, in accordance with one embodiment (block 480). The object comparative analysis system 218 (FIG. 1) is responsible for analyzing the worker's behavior that leads to smart work and work completion rate and is configured, in certain embodiments, to analyze worker behavior for undesired issues such as those discussed above. As is understood, tracking an object in a video sequence can lose some of the images, and sometimes a video sequence can have multiple objects. If a first object being monitored in a video (e.g., a human performing a task) goes out of the camera view for a few image frames and a second object appears in the frame, the system has to be able to determine if the second object is the same as or different from the first object. Without knowing about the motion and past movement of the first object, and the predicted future motion of the first object, it can be challenging to uniquely track a specific object in a video stream of images.

In this case, the object comparative analysis of block 475 is able to estimate the new position of the object anyway. For example, the objects which are not detected by the object-detection algorithm could calculate their positions using the information of their positions in the previous images, as is understood in the art. Referring to FIG. 9, for each tracked object found in image sequence 906, calculate its speed (in pixels/s) at time t, which is the difference of coordination point of the bounding box centers between positions of this object in images at times t and t−1.

In certain embodiments, a single object tracking method, ROLO (Recurrent You Only Look Once algorithm) is used that combines object detection and recurrent neural networks. ROLO is a type of machine vision processing that is a combination of "you only look once" (YOLO) and LSTM. YOLO is advantageous because it can run in real time with high accuracy and only looks at the image "once), via only one forward propagation pass through the neural network, to make predictions about the object.

The object detection module 912 of FIG. 9 uses YOLO to collect visual features, along with location inference priors. At each time-step (frame), the LSTM 922 receives an input feature vector of length 4096 (reference 911 in FIG. 9) and returns the location 924 of the tracked object.

The object comparative analysis block 475 also provides the summary and style of the work performed by a worker (e.g., information that can lead to some of the analysis output in FIG. 8). The style is based on the context of work completed time and position. For example, when the worker completes their work consistently in less time, that needs to be considered the smart way of working (e.g., an efficient style which is a desired activity). By applying this information, a machine learning model classifies the type of style needed in this context and records the context and style used here. Considering the complexity of the data dimension for making that decision, it is appropriate to leverage machine learning algorithms for performance and accuracy.

In certain embodiments, the algorithm Random Forest is used to help provide classifications of user activity. Random Forest uses a large group of complex decision trees and can provide classification predictions with a high degree of accuracy on any size of data. The recommendation engine leverages an ensemble, decision tree-based bagging technique named Random Forest for multinomial classification of actions. This model uses historical training data containing multi-dimension data points to train the model. Once the model is fully trained, the style state is passed to predict the following best style. This engine algorithm will predict the recommended style/pattern with the accuracy or likelihood percentage. The accuracy of the model can be improved by hyperparameter tuning.

Figure 10:
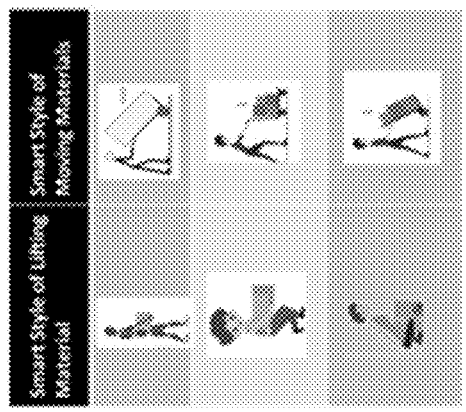
FIG. 10 is an example table of recommendations output of the system of FIGS. 1 and 3, in accordance with one embodiment.

By block 485, a day's activity by a worker has been recorded and classified. The data that has been classified is analyzed, based on context, and recommendations can be generated to frames the identified context. Thus, in block 485, a summary report can be generated, based at least in part on the image segmentation (if applicable), object time analysis, object comparative analysis, and/or the training data set. The summary report includes information a summary report on worker activity and optionally includes one or more recommendations that are generated based on the object time analysis, object comparative analysis, and/or the training data set. For example, if the summary report includes information or indicators associated with an undesired condition associated with worker activity (e.g., a behavior of the worker that can lead to a bad health outcome, such as lifting objects in an inappropriate, back-straining way), the recommendation can be configured to remediate at least some of the undesired condition (e.g., a recommendation on how a worker can improve or change a work style to avoid strain on his or her back, for example by using more leg muscles as part of the lifting). The recommendations can be provided in various ways, such as the visual table of FIG. 10 (block 490). FIG. 10 is an example table 1000 of recommendations output of the system of FIGS. 1 and 3, in accordance with one embodiment. The table 1000 shows images that can be provided to a worker 303 to go with recommendations such as those of FIG. 8 and FIG. 7B, e.g., smart styles of lifting materials and smart styles of moving materials.

In certain embodiments, the IWAE 202 is configured to generate one or more of a user report, use feedback, and/or user recommendations. For example, in certain embodiments a worker 303 or supervisor 305 can request a user report and/or recommendations at any time or can set up the IWAE 202 to provide reports and/or recommendations at predetermined times or intervals (e.g., at the end of every work week). In some instances, the IWAE 202 can provide user reports and/or recommendations even without user prompting. For example, the IWAE 202 may become aware of (or search for) industry and/or training content 136, or other pertinent content, that the IWAE 202 determines may be of interest to the user or may be appropriate to help the user improve skills and/or effectiveness, where these determinations are based on information in the repository 210 and/or dynamic or historical analysis of user interactions, whether historical or "on the fly". The user report can, for example, include detailed recommendations such as those shown in the table of FIG. 8.

For example, in some embodiments, the IWAE 202 can be configured to provide an "on the fly" recommendation or feedback to a worker 303, based on dynamic monitoring of worker activities. If the interactions, activities and pertinent information are dynamically provided, in real-time, to the IWAE 202, it could be possible for the IWAE 202 to analyze video, as worker activity is taking place, and dynamically seek out related training content that may be helpful for the worker 303 and may alert the worker 303 and/or the supervisor about how to immediately improve performance of the activity, or how to improve a task the next time it is done.

As can be seen above, the IWAE 202 and the systems 100 and 300, discussed above, and the method of flowchart 400 ("embodiments herein"), help to consolidates workers' on-the-job activities by using streamed video images and, optionally, other types of tracked user information (e.g., sensor information, information stored on devices, etc., as previously noted). This aids in the discovery of patterns in worker behavior on the job, which can then be compared to image data to which the IWAE 202, system 100, and/or system 300 has been trained, where the image data helps to:
provide insight into specific worker behaviors that can cause health problems, increase odds of accidents;
recommend specific areas of improvement in a worker's handling of tools, machines, etc.;

The embodiments herein help to identify work patterns that improve worker productivity and to record those patterns, along with the generation of specific instructions to:
share with the supervisor/employer the insights, tasks, and activities completed by the worker in sufficient detail, to allow workers to obtain constructive feedback and direction; and
provide a retrospect view of the end of the month, quarter, and year conversations, generating insights into activities where time has been spent with this worker's productivity is accelerated.

In short, the organization will be able to boost worker productivity, improve product quality, provide a safe working environment, and increase machine output as a result of at least some of the embodiments herein, to help and improve a company's earnings and reputation.

Figure 11:
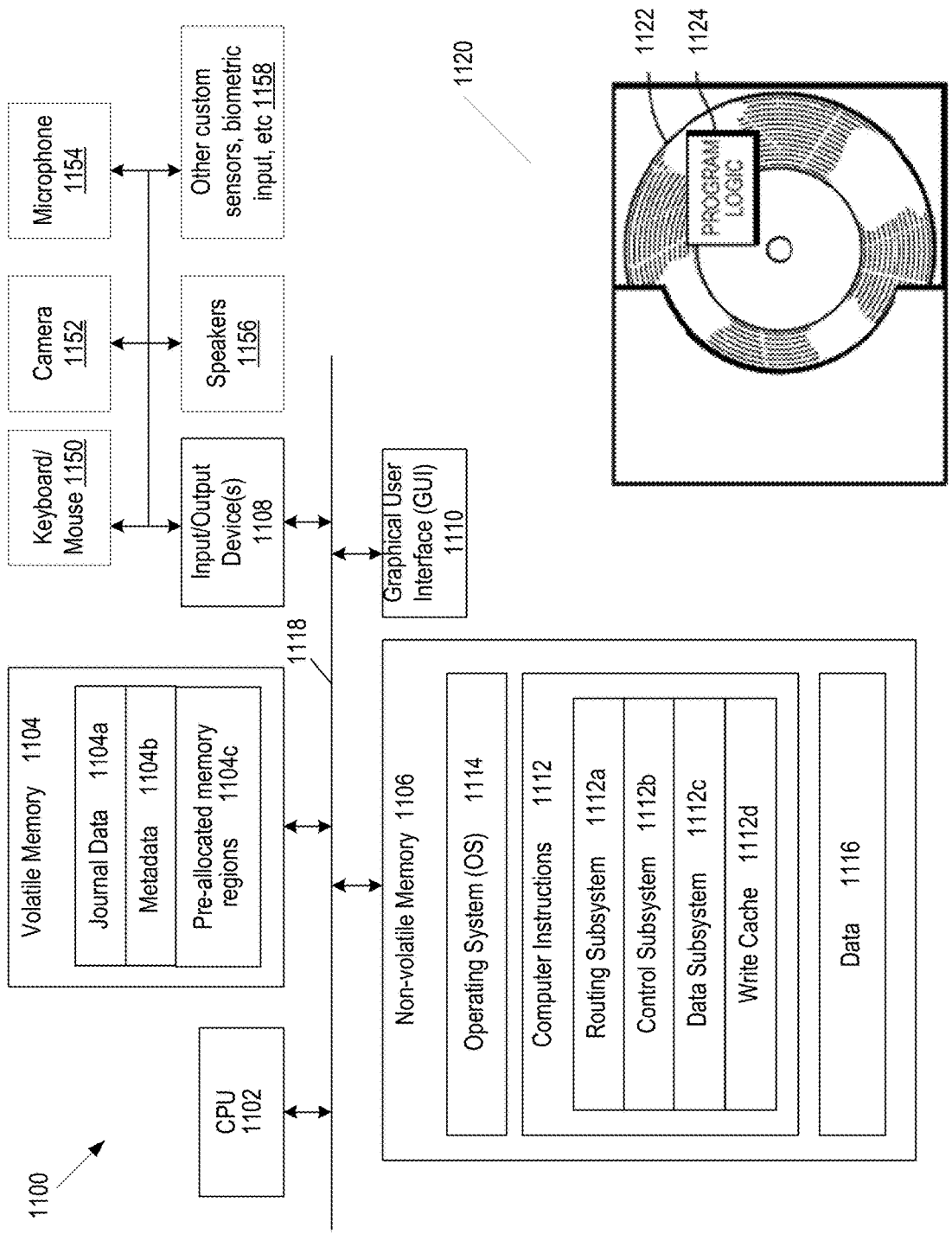
FIG. 11 is a block diagram of an exemplary computer system usable with at least some of the systems, methods, examples, and outputs of FIGS. 1-9, in accordance with one embodiment.

FIG. 11 is a block diagram of an exemplary computer system 1100 usable with at least some of the systems and apparatuses of FIGS. 1-10, in accordance with one embodiment. Reference is made briefly to FIG. 11, which shows a block diagram of a computer system 1100 usable with at least some embodiments. The computer system 1100 also can be used to implement all or part of any of the methods, systems, and/or devices described herein.

As shown in FIG. 11, computer system 1100 may include processor/central processing unit (CPU) 1102, volatile memory 1104 (e.g., RAM), non-volatile memory 1106 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1110 (e.g., a touchscreen, a display, and so forth) and input and/or output (I/O) device 1108 (e.g., a mouse/keyboard 1150, a camera 1152, a microphone 1154, speakers 1156 and optionally other custom sensors 1158, providing user input, such as biometric sensors, accelerometers, position sensors, etc.). A bus 1118 interconnects the CPU 1102, volatile memory 1104, non-volatile memory 1106, GUI 1110, I/O devices 1108, speakers 1156, keyboard/mouse 1150, camera 1154 (e.g., webcam), microphone 1154, and/or other custom sensors 1158, as will be understood.

Non-volatile memory 1106 stores, e.g., journal data 1104*a*, metadata 1104*b*, and pre-allocated memory regions 1104*c*. The non-volatile memory, 1106 can include, in some embodiments, an operating system 1114, and computer instructions 1112, and data 1116. In certain embodiment, the non-volatile memory 1106 is configured to be a memory storing instructions that are executed by a processor, such as processor/CPU 1102. In certain embodiments, the computer instructions 1112 are configured to provide several subsystems, including a routing subsystem 1112A, a control subsystem 1112*b*, a data subsystem 1112*c*, and a write cache 1112*d*. In certain embodiments, the computer instructions 1112 are executed by the processor/CPU 1102 out of volatile memory 1104 to implement and/or perform at least a portion of the systems and processes shown in FIGS. 1-13. Program code also may be applied to data entered using an input device or GUI 1110 or received from I/O device 1108.

The systems, architectures, and processes of FIGS. 1-11 are not limited to use with the hardware and software described and illustrated herein and may find applicability in any computing or processing environment and with any type of machine or set of machines that may be capable of running a computer program and/or of implementing a radar system (including, in some embodiments, software defined radar). The processes described herein may be implemented in hardware, software, or a combination of the two. The logic for carrying out the methods discussed herein may be embodied as part of the system described in FIG. 11. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor/CPU 1102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 11, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 11 shows Program Logic 1124 embodied on a computer-readable medium 1120 as shown, and wherein the Logic is encoded in computer-executable code thereby forms a Computer Program Product 1122. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, terms such as "message" and "signal" may refer to one or more currents, one or more voltages, and/or or a data signal. Within the drawings, like or related elements have like or related alpha, numeric or alphanumeric designators. Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the disclosure herein must comprise more than one of that element, nor is it intended by illustrating a single element that the any disclosure herein is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination.

What is claimed is:

1. A computer-implemented method, comprising:
receiving a set of raw worker data records associated with one or more worker activities of a specific worker having an identity, each respective raw worker data record comprising a computer-readable record comprising first sensor information collected from a first sensor and second sensor information collected from a second sensor, wherein:
the first sensor information comprises information collected from a first sensor, the first sensor information comprising information configured to individually identify the specific worker, wherein the first sensor information comprises information from at least one of: a biometric sensor worn by the specific worker and a biometric sensor with which the specific worker interacts; and
the second sensor information comprises information collected from a second sensor while the specific worker is performing the one or more worker activities, the second sensor comprising at least one of a wearable sensor, a sensor coupled to an entity, a sensor embedded in an entity, and an image sensor, wherein the second sensor information comprises one or more of an image, a video, information indicative of a behavior of the specific worker, information indicative of a position of at least one of the specific worker and the entity, information indicative of a movement of at least one of the specific worker and the entity, and information indicative of an interaction between the specific worker and the entity;
performing an identification analysis on the set of raw worker data records to determine, based on the biometric information, the identity of the specific worker;
persisting, based on the identity of the specific worker, the set of raw worker data records in an encrypted, computer-readable format in a respective personal knowledge repository configured to continually accumulate information about the specific worker;
performing a first analysis on the set of raw worker data records, the first analysis configured to analyze the set of raw worker data records, including second sensor information collected in real-time, as well as the information about the specific worker stored in the respective personal knowledge repository and a training data set, to train a convolution neural network (CNN) to learn one or more behaviors of the specific worker, wherein the training of the CNN is configured to build a dynamic CNN model having expertise that is specific to the specific worker;
performing a second analysis on the set of raw worker data records, wherein the second analysis is configured to perform human behavior recognition (HBR) to classify the set of raw worker data records, including the second sensor information as it is collected in real-time, into one or more types of behaviors;
performing, based on the first analysis and the second analysis, a third analysis, the third analysis configured to dynamically analyze the one or more types of behaviors for one or more undesired conditions;
generating in real-time, based on the dynamic CNN model and at least one of the second analysis and the third analysis, a first output comprising a summary of the one or more worker activities of the specific worker, the summary comprising information indicating whether any of the one or more worker activities comprises the one or more undesired conditions;
persisting the first output, along with results from at least one of the first analysis, the second analysis, and the third analysis, in the respective personal knowledge repository;
providing information from the respective personal knowledge repository to the training data set; and
training the CNN to update the dynamic CNN model in accordance with at least one of the first analysis, the second analysis, and the third analysis.

2. The computer-implemented method of claim 1, further comprising:
performing, based on the third analysis, a fourth analysis, the fourth analysis configured to access a training set of comparative behaviors to the one or more types of behaviors, wherein, the training set of comparative behaviors comprises at least one action configured to remediate the one or more undesired conditions; and
generating in real-time, based on the fourth analysis and the summary of worker activity, a second output comprising at least one recommended action for the specific worker, the at least one recommended action comprising at least one comparative behavior from the training set of comparative behaviors.

3. The computer-implemented method of claim 1, further comprising:
persisting, based on the identity of the specific worker, at least one of: a set of results of the first analysis, a set of results of the second analysis, a set of results of the third analysis, and the summary of worker activity, in the respective personal knowledge repository.

4. The computer-implemented method of claim 2, further comprising generating in real-time, based on the summary of worker activity, an output comprising at least one recommended action for the worker, wherein the at least one recommended action is further based on the accumulated information about the specific worker that is stored in the respective personal knowledge repository.

5. The computer-implemented method of claim 2, wherein at least one of the first analysis, second analysis, and third analysis are based at least in part on accumulated information about the specific worker in the personal knowledge repository.

6. The computer-implemented method of claim 1, wherein the second analysis comprises image processing using the CNN.

7. A system, comprising:
a processor; and
a non-volatile memory in operable communication with the processor and storing computer program code that when executed on the processor causes the processor to execute a process operable to perform operations of:
receiving a set of raw worker data records associated with one or more worker activities of a specific worker having an identity, each respective raw worker data record comprising a computer-readable record comprising first sensor information collected from a first sensor and second sensor information collected from a second sensor, wherein:
the first sensor information comprises information collected from a first sensor, the first sensor information comprising information configured to individually identify the specific worker, wherein the first sensor information comprises information from at least one of: a biometric sensor worn by the specific worker and a biometric sensor with which the specific worker interacts; and the second sensor information comprises information collected from a second sensor while the specific worker is performing the one or more worker activities, the second sensor comprising at least one of a wearable sensor, a sensor coupled to an entity, a sensor embedded in an entity, and an image sensor, wherein the second sensor information comprises one or more of an image, a video, information indicative of a behavior of the specific worker, information indicative of a position of at least one of the specific worker and the entity, information indicative of a movement of at least one of the specific worker and the entity, and information indicative of an interaction between the specific worker and the entity;

performing an identification analysis on the set of raw worker data records to determine, based on the biometric information, the identity of the specific worker;

persisting, based on the identity of the specific worker, the set of raw worker data records in an encrypted, computer-readable format in a respective personal knowledge repository configured to continually accumulate information about the specific worker;

performing a first analysis on the set of raw worker data records, the first analysis configured to analyze the set of raw worker data records, including second sensor information collected in real-time as well as the information about the specific worker stored in the respective personal knowledge repository and a training data set, to train a convolution neural network (CNN) to learn one or more behaviors of the specific worker, wherein the training of the CNN is configured to build a dynamic CNN model having expertise that is specific to the specific worker;

performing a second analysis on the set of raw worker data records, wherein the second analysis is configured to perform human behavior recognition (HBR) to classify the set of raw worker data records, including the second sensor information as it is collected in real-time, into one or more types of behaviors;

performing, based on the first analysis and the second analysis, a third analysis, the third analysis configured to dynamically analyze the one or more types of behaviors for one or more undesired conditions; and generating in real-time, based on the dynamic CNN model and at least one of the second analysis and the third analysis, a first output comprising a summary of the one or more worker activities of the specific worker, the summary comprising information indicating whether any of the one or more worker activities comprises the one or more undesired conditions;

persisting the first output, along with results from at least one of the first analysis, the second analysis, and the third analysis, in the respective personal knowledge repository;

providing information from the respective personal knowledge repository to the training data set; and training the CNN to update the dynamic CNN model in accordance with at least one of the first analysis, the second analysis, and the third analysis.

8. The system of claim 7, further comprising providing computer program code that when executed on the processor causes the processor to perform operations of:

performing, based on the third analysis, a fourth analysis, the fourth analysis configured to access a training set of comparative behaviors to the one or more types of behaviors, wherein, the training set of comparative behaviors comprises at least one action configured to remediate the one or more undesired conditions; and generating in real-time, based on the fourth analysis and the summary of worker activity, a second output comprising at least one recommended action for the specific worker, the at least one recommended action comprising at least one comparative behavior from the training set of comparative behaviors.

9. The system of claim 8, further comprising providing computer program code that when executed on the processor causes the processor to perform an operation of:

persisting, based on the identity of the specific worker, at least one of a set of results of the first analysis, a set of results of the second analysis, a set of results of the third analysis, and the summary of worker activity, in the respective personal knowledge repository.

10. The system of claim 8, further comprising providing computer program code that when executed on the processor causes the processor to perform an operation of generating in real-time, based on the summary of worker activity, an output comprising at least one recommended action for the worker, wherein the at least one recommended action is further based on the accumulated information about the specific worker that is stored in the respective personal knowledge repository.

11. The system of claim 8, wherein at least one of the first analysis, second analysis, and third analysis are based at least in part on accumulated information about the specific worker in the personal knowledge repository.

12. The system of claim 7, wherein the second analysis comprises image processing using the CNN.

13. A computer program product including a non-transitory computer readable storage medium having computer program code encoded thereon that when executed on a processor of a computer causes the computer to operate an intelligent assistant system, the computer program product comprising:

computer program code for receiving a set of raw worker data records associated with one or more worker activities of a specific worker having an identity, each respective raw worker data record comprising first sensor information collected from a first sensor and second sensor information collected from a second sensor, wherein:

the first sensor information comprises information collected from a first sensor, the first sensor information comprising information configured to individually identify the specific worker, wherein the first sensor information comprises information from at least one of: a biometric sensor worn by the specific worker and a biometric sensor with which the specific worker interacts; and the second sensor information comprises information collected from a second sensor while the specific worker is performing the one or more worker activities, the second sensor comprising at least one of a wearable sensor, a sensor coupled to an entity, a sensor embedded in an entity, and an image sensor, wherein the second sensor information comprises one or more of an image, a video, information indicative of a behavior of the specific worker, information indicative of a position of at least one of the specific worker and the entity, information indicative of a movement of at least one of the specific worker and the entity, and information indicative of an interaction between the specific worker and the entity;

computer program code for performing an identification analysis on the set of raw worker data records to determine, based on the biometric information, the identity of the specific worker;

computer program code for persisting, based on the identity of the specific worker, the set of raw worker data records in an encrypted, computer-readable format in a respective personal knowledge repository configured to continually accumulate information about the specific worker;

computer program code for performing a first analysis on the set of raw worker data records, the first analysis configured to analyze the set of raw worker data records, including second sensor information collected in real time, as well as the information about the specific worker stored in the respective personal knowledge repository and a training data set, to train a convolution neural network (CNN) to learn one or more behaviors of the specific worker, wherein the training of the CNN is configured to build a dynamic CNN model having expertise that is specific to the specific worker;

computer program code for performing a second analysis on the set of raw worker data records, wherein the second analysis is configured to perform human behavior recognition (HBR) to classify the set of raw worker data records, including the second sensor information as it is collected in real-time, into one or more types of behaviors;

computer program code for performing, based on the first analysis and the second analysis, a third analysis, the third analysis configured to dynamically analyze the one or more types of behaviors for one or more undesired conditions;

computer program code for generating in real-time, based on the dynamic CNN model and at least one of the second analysis and the third analysis, a first output comprising a summary of the one or more worker activities of the specific worker, the summary comprising information indicating whether any of the one or more worker activities comprises the one or more undesired conditions;

computer program code for persisting the first output, along with results from at least one of the first analysis, the second analysis, and the third analysis, in the respective personal knowledge repository;

computer program code for providing information from the respective personal knowledge repository to the training data set; and computer program code for training the CNN to update the dynamic CNN model in accordance with at least one of the first analysis, the second analysis, and the third analysis.

14. The computer program product of claim 13, further comprising:

computer program code for performing, based on the third analysis, a fourth analysis, the fourth analysis configured to access a training set of comparative behaviors to the one or more types of behaviors, wherein, the training set of comparative behaviors comprises at least one action configured to remediate the one or more undesired conditions; and computer program code for generating in real-time, based on the fourth analysis and the summary of worker activity, a second output comprising at least one recommended action for the specific worker, the at least one recommended action comprising at least one comparative behavior from the training set of comparative behaviors.

15. The computer program product of claim 13, further comprising:

computer program code for persisting, based on the identity of the specific worker, at least one of a set of results of the first analysis, a set of results of the second analysis, a set of results of the third analysis, and the summary of worker activity, in the respective personal knowledge repository.

16. The computer program product of claim 15, further comprising computer program code for generating in real-time, based on the summary of worker activity, an output comprising at least one recommended action for the worker, wherein the at least one recommended action is further based on the information about the specific worker that is stored in the respective personal knowledge repository.

17. The computer program product of claim 13, wherein the second analysis comprises image processing using the CNN.

18. The computer-implemented method of claim 2, further comprising generating in real-time at least one control configured to implement the at least one action automatically, on behalf of the specific worker, without requiring the specific worker to take action.

19. The system of claim 8, further comprising computer program code that when executed on the processor causes the processor to perform an operation of generating in real-time at least one control configured to implement the at least one action automatically, on behalf of the specific worker, without requiring the specific worker to take action.

20. The computer program product of claim 14, further comprising computer program code for generating in real-time at least one control configured to implement the at least one action automatically, on behalf of the specific worker, without requiring the specific worker to take action.

* * * * *